(12) United States Patent
Davis

(10) Patent No.: US 7,674,443 B1
(45) Date of Patent: Mar. 9, 2010

(54) ZERO EMISSION GASIFICATION, POWER GENERATION, CARBON OXIDES MANAGEMENT AND METALLURGICAL REDUCTION PROCESSES, APPARATUS, SYSTEMS, AND INTEGRATION THEREOF

(76) Inventor: Irvin Davis, 5006 40th Pl., Hyattsville, MD (US) 20781

( * ) Notice: Subject to any disclaimer, the term of this patent is extended or adjusted under 35 U.S.C. 154(b) by 0 days.

(21) Appl. No.: 12/193,692

(22) Filed: Aug. 18, 2008

(51) Int. Cl.
*B01D 47/00* (2006.01)
*F02C 1/00* (2006.01)

(52) U.S. Cl. .................. 423/220; 423/210; 423/224; 423/248; 60/722; 60/801

(58) Field of Classification Search ............ 60/801, 60/722; 423/210–248, 592.1
See application file for complete search history.

(56) References Cited

U.S. PATENT DOCUMENTS 4,624,684 A * 11/1986 Stevenson ............ 48/197 R
2004/0058207 A1 * 3/2004 Galloway ................ 429/17

* cited by examiner

*Primary Examiner*—Timothy C Vanoy
*Assistant Examiner*—Richard M Rump

(57) ABSTRACT

A system involving a two-step gasification of a carbonaceous source to produce bulk hydrogen that avoids the early formation of $CO_2$ and obviates the traditional water gas shift (WGSR) step, carbochlorination of a metallic ore the production of metals found in the ore that utilizes carbon monoxide as an oxygen sink, rather than the traditional coke, and carbon oxides management that eliminates major impediments to emission-neutral power generation and the reduction of major metals. The gasification uses a rotary kiln reactor and gas-gas cyclonic separation process to separate synthesis gas into purified hydrogen and purified carbon monoxide. Purified bulk carbon monoxide issued in metallurgical reduction, and purified bulk hydrogen as fuel for an emission-neutral hydrogen combined cycle (HCC) turbine power generation station. The carbochlorination is integrated with: a) the concurrent separation and purification of all metal-chlorides (metchlors) and capture of $CO_2$ for passage to the carbon oxides management system; b) the direct reduction of metchlors to nanoscale metallurgical powders and/or to dendritically-shaped particles, including metchlor reduction for the ultrahigh-performance semiconductor metals of the III-V group; and, c) the reforming of metal-oxides with improved crystalline structure from metchlors. The carbon oxides management collects, stores and directs to points of usage, carbon oxides that arise in various processes of the integrated system, and captures carbon monoxide for process enhancement and economic uses and captures carbon dioxide as a process intermediate and for economic uses.

29 Claims, 22 Drawing Sheets

SETZE INTEGRAL PROCESS

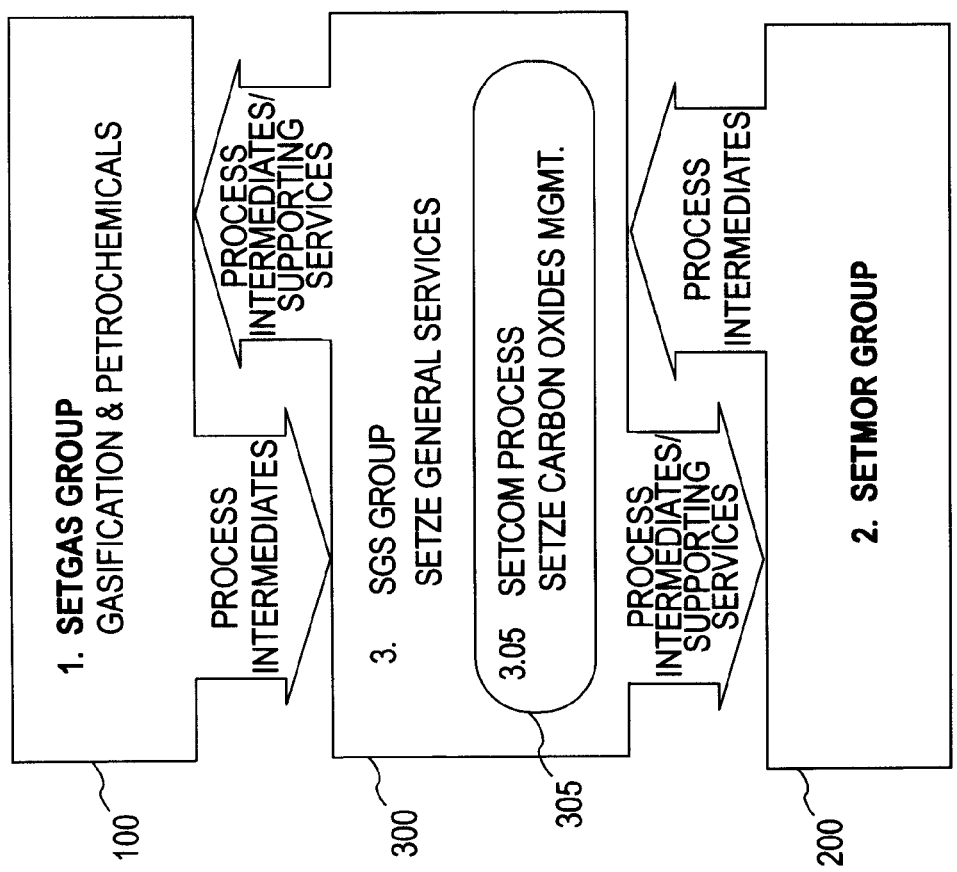
FIG. 1.0
SETZE INTEGRAL PROCESS

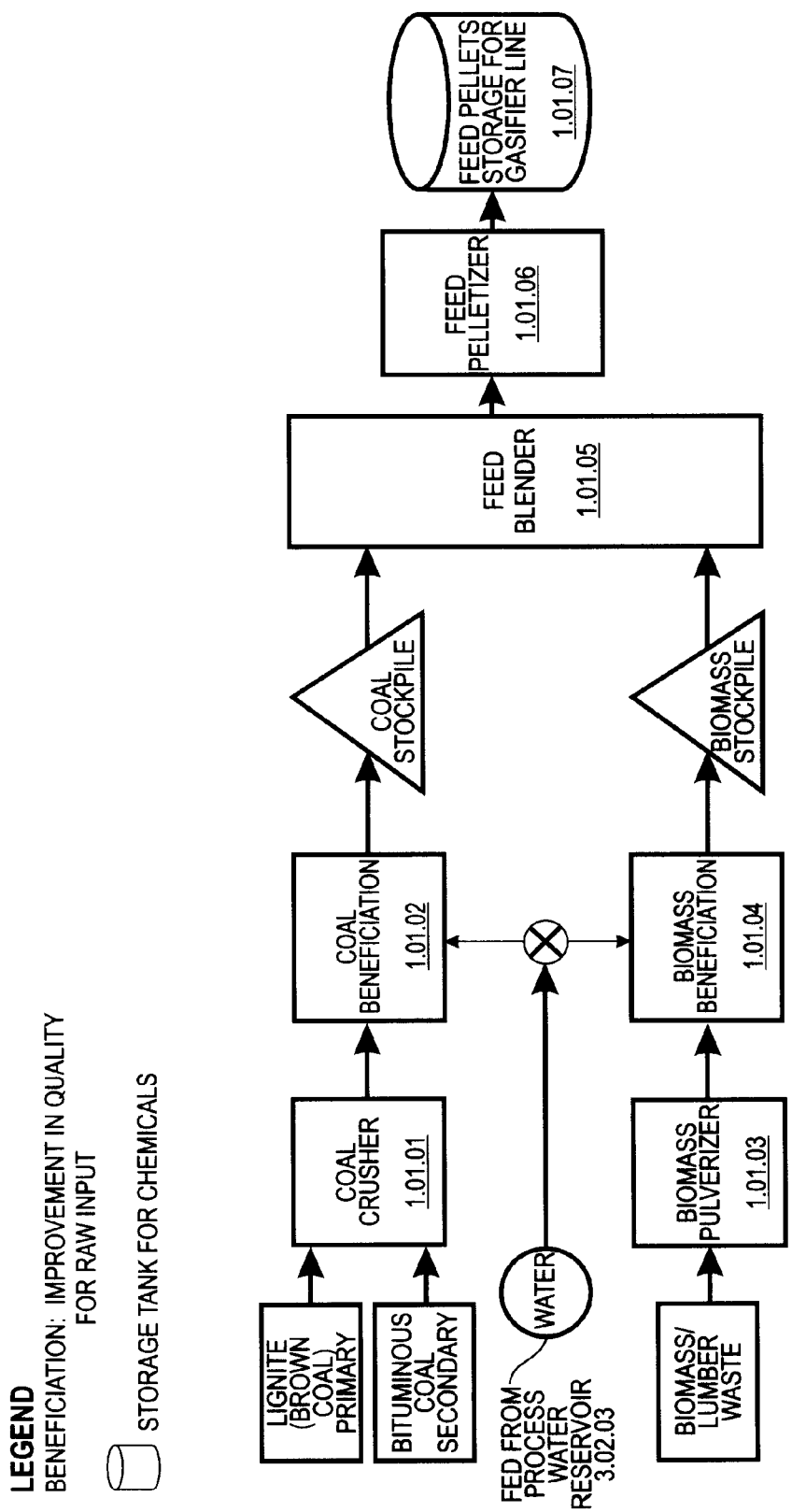
FIG. 1.01
SETGAS PRODUCTION
GASIFIER KILN FEED PREPARATION SUBPROCESS

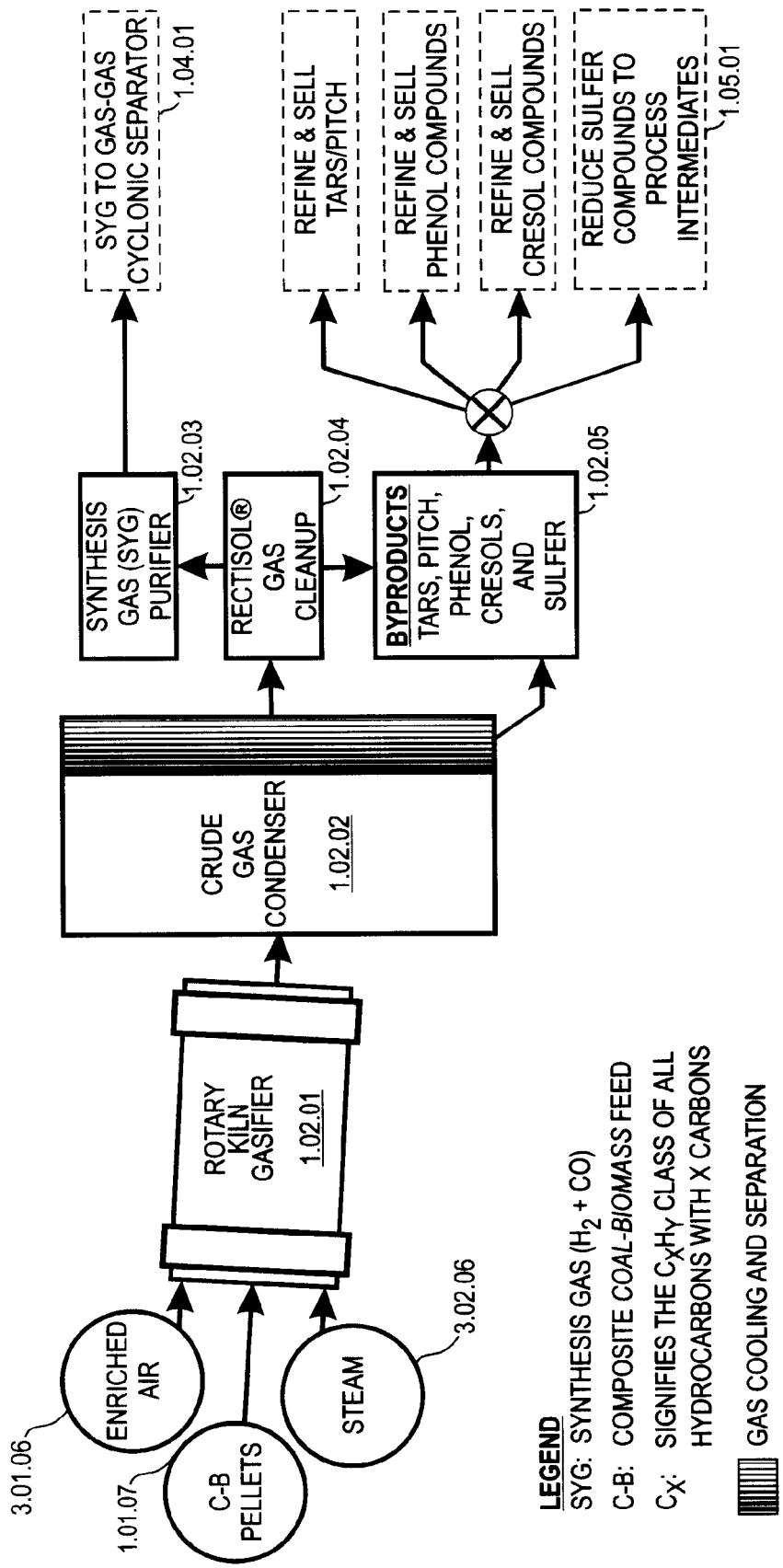
FIG. 1.02
SETGAS PRODUCTION
COAL-BIOMASS GASIFICATION PROCESS

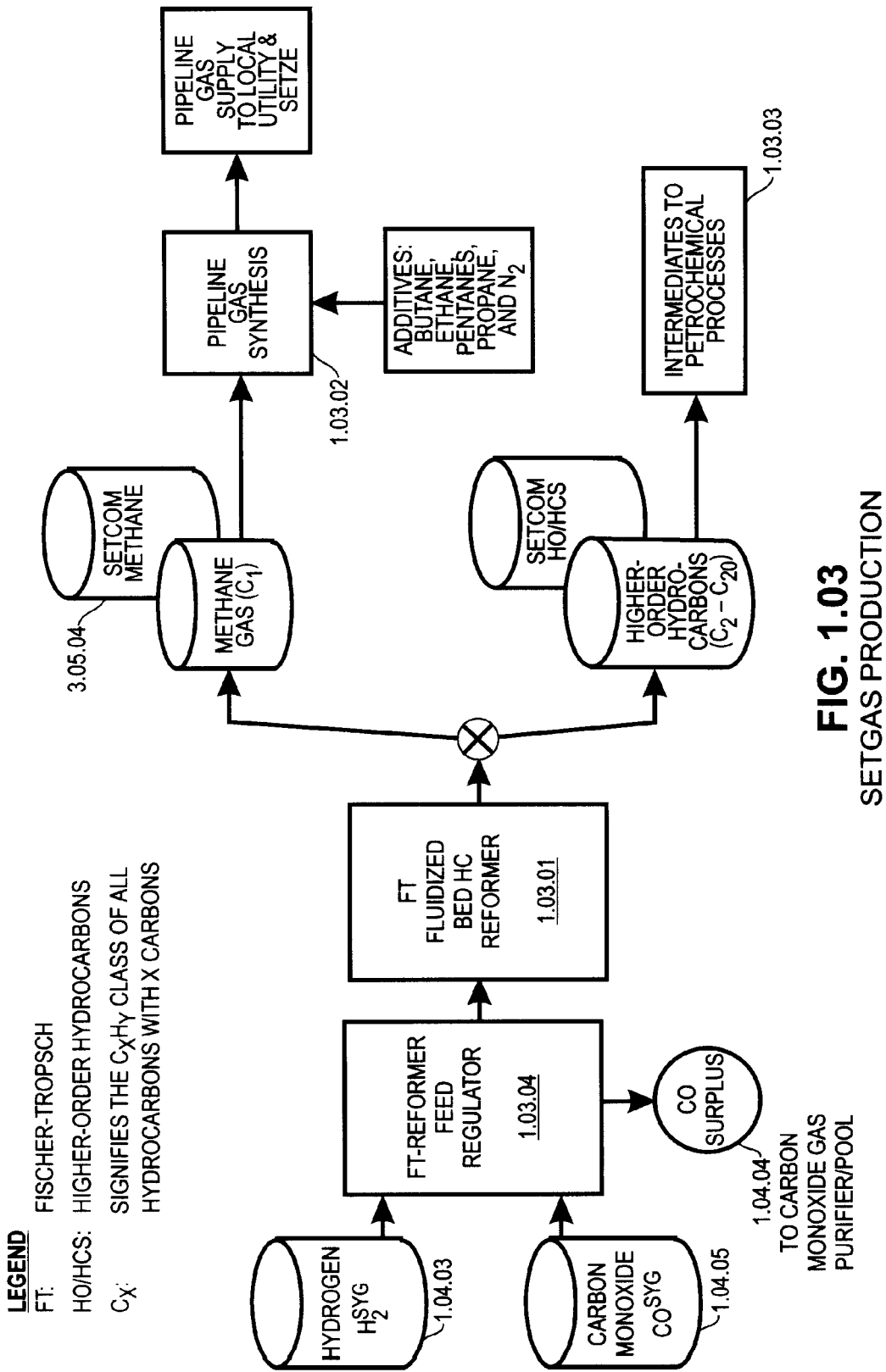
FIG. 1.03
SETGAS PRODUCTION
FT HYDROCARBONS REFORMER & PIPELINE GAS SUBPROCESS

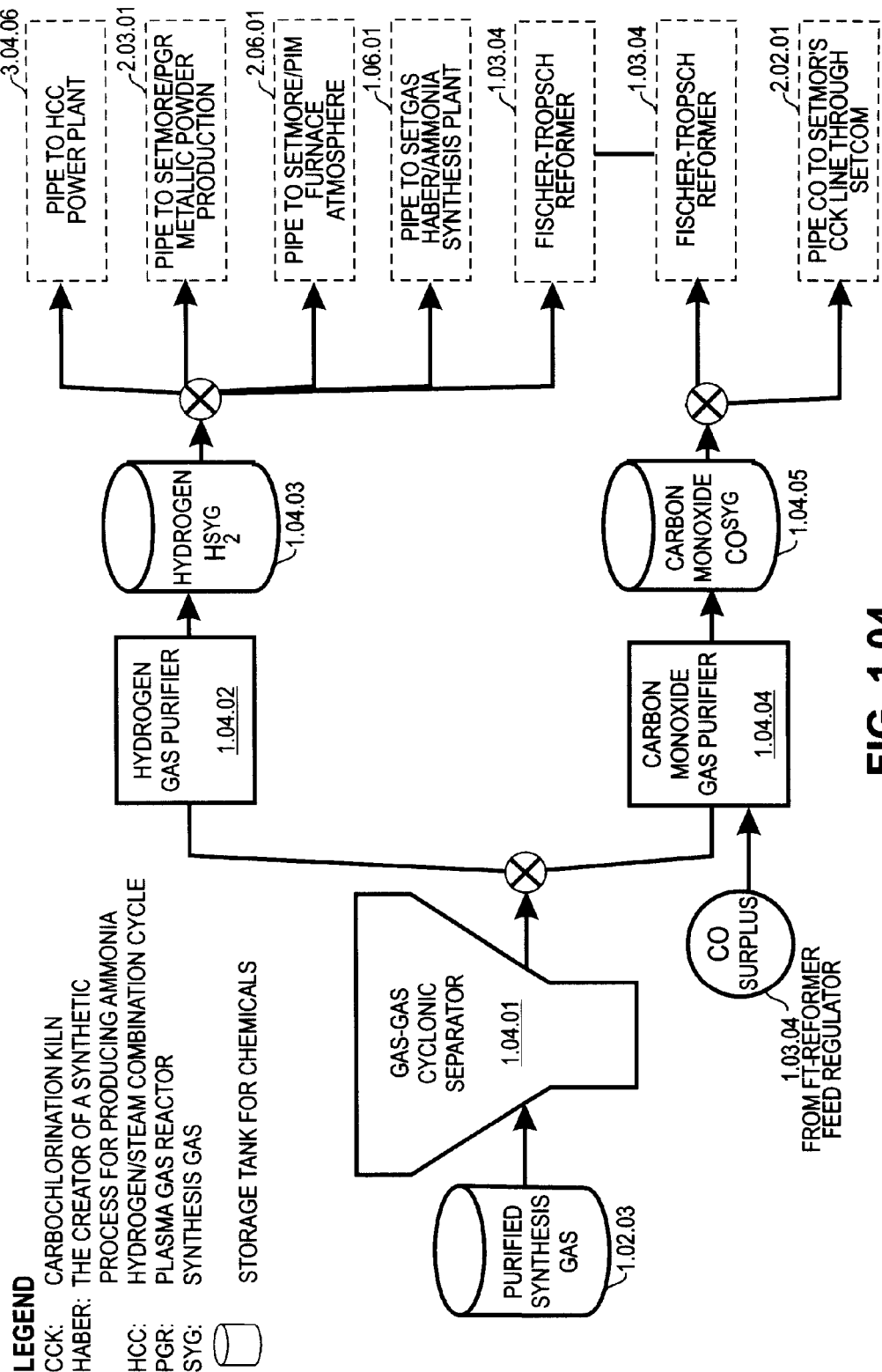
FIG. 1.04
SETGAS GASIFICATION
SYG GAS-GAS CYCLONIC SEPARATION SUBPROCESS

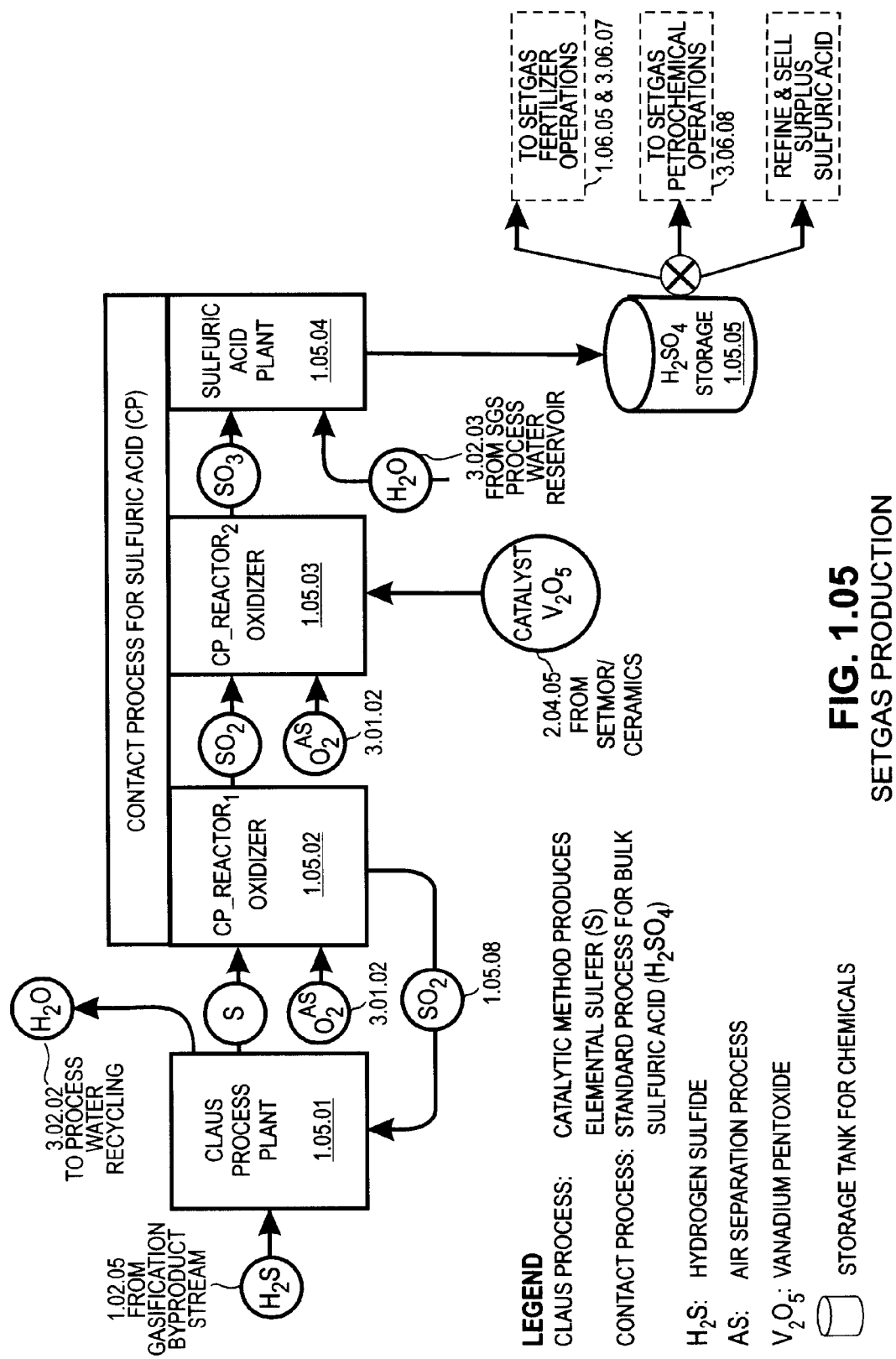
FIG. 1.05
SETGAS PRODUCTION
SULFER INTERMEDIATES' PRODUCTION SUBPROCESS

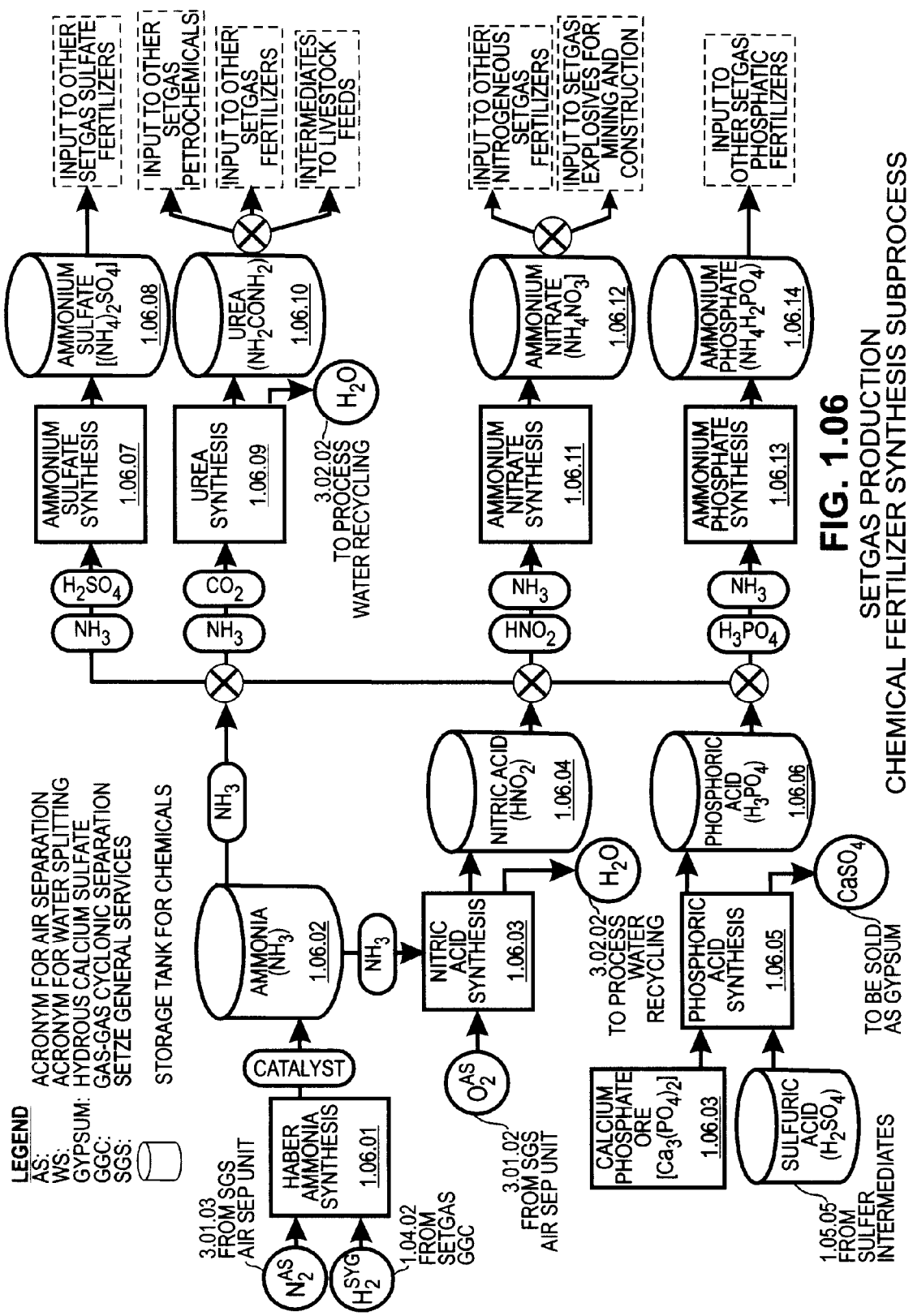
FIG. 1.06
SETGAS PRODUCTION
CHEMICAL FERTILIZER SYNTHESIS SUBPROCESS

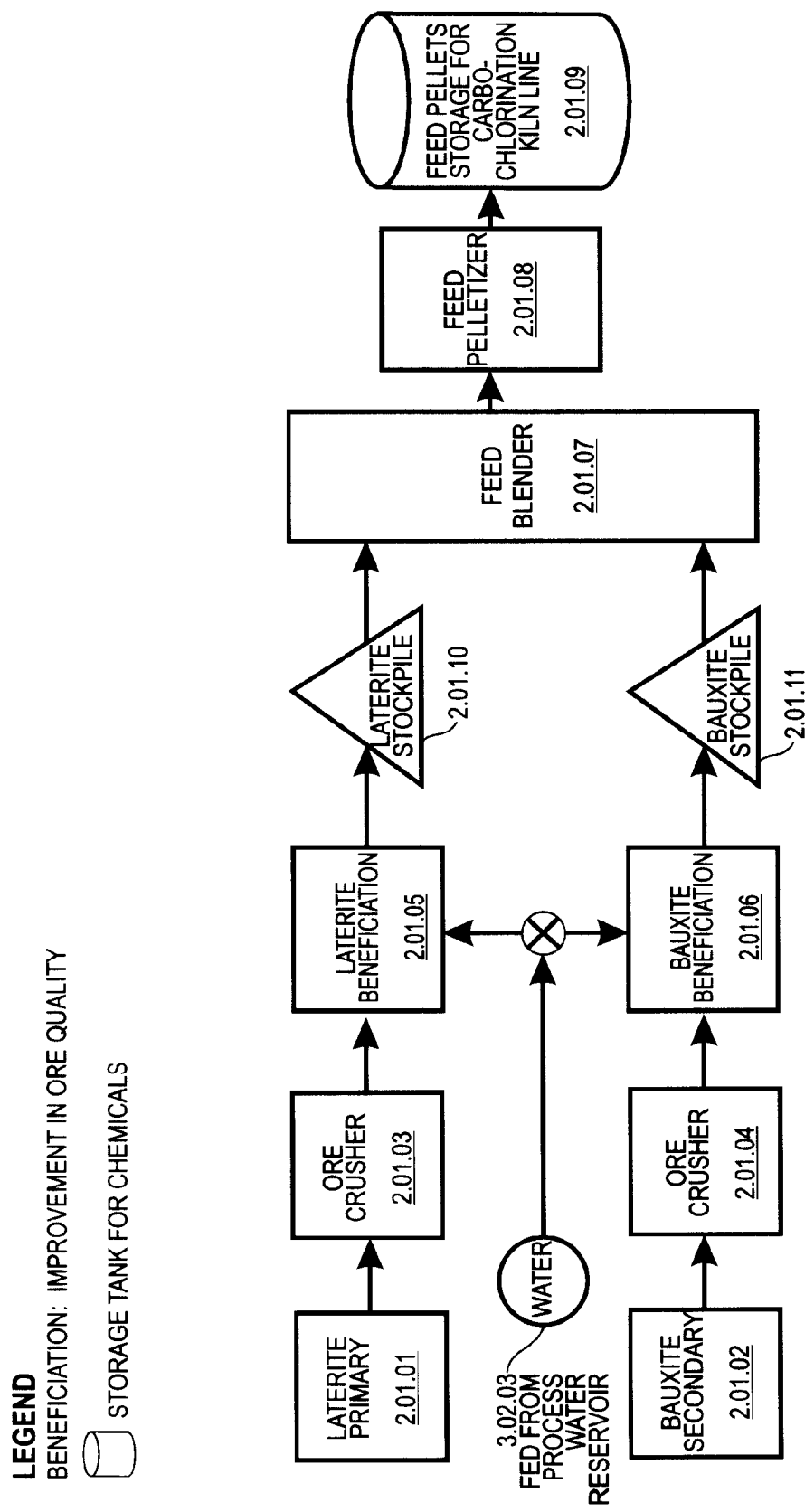
FIG. 2.01
SETZE PRODUCTION
CARBOCHLORINATION KILN FEED PREPARATION SUBSYSTEM

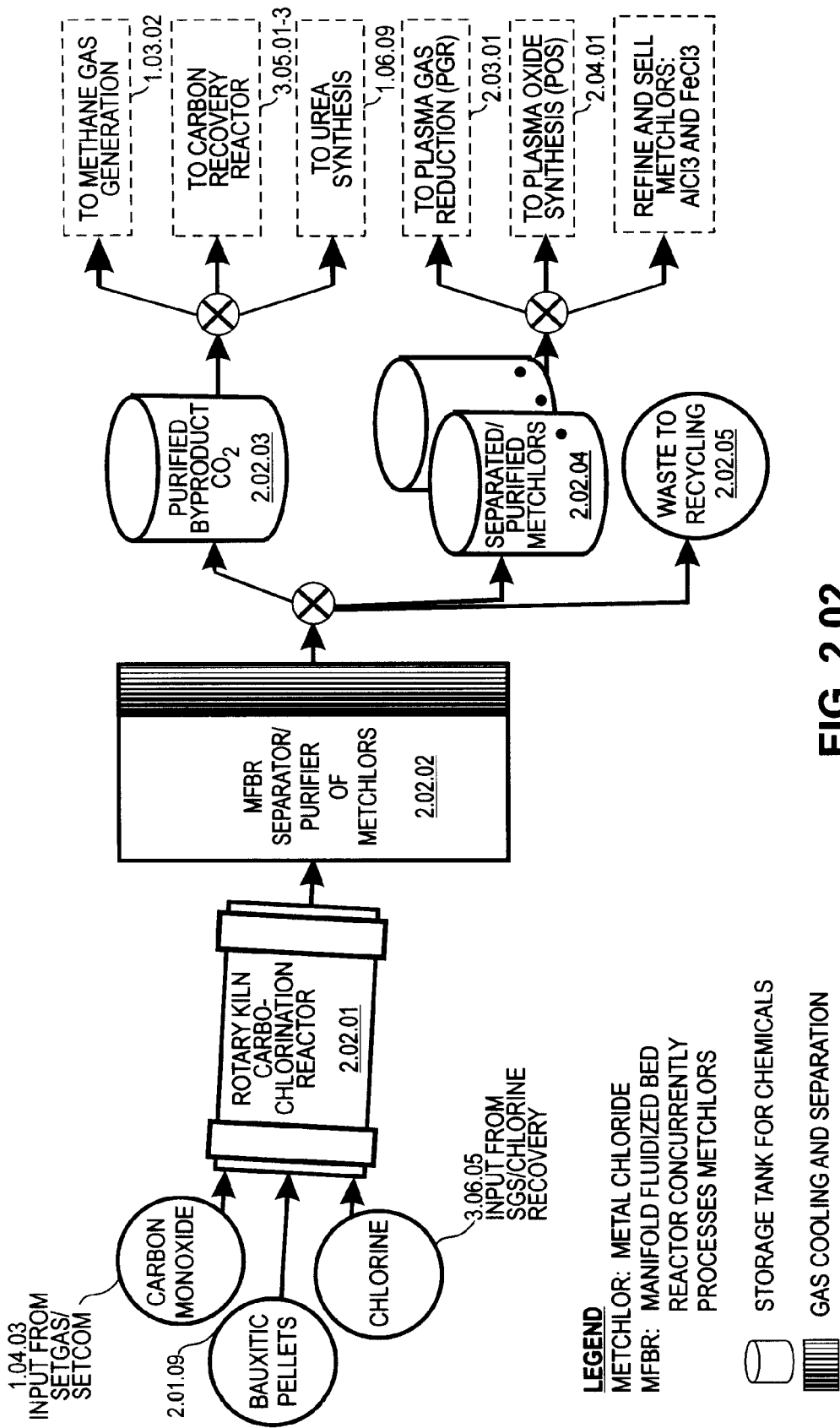
FIG. 2.02
SETMOR PRODUCTION
BAUXITE CARBOCHLORINATION/MFBR SUBPROCESS

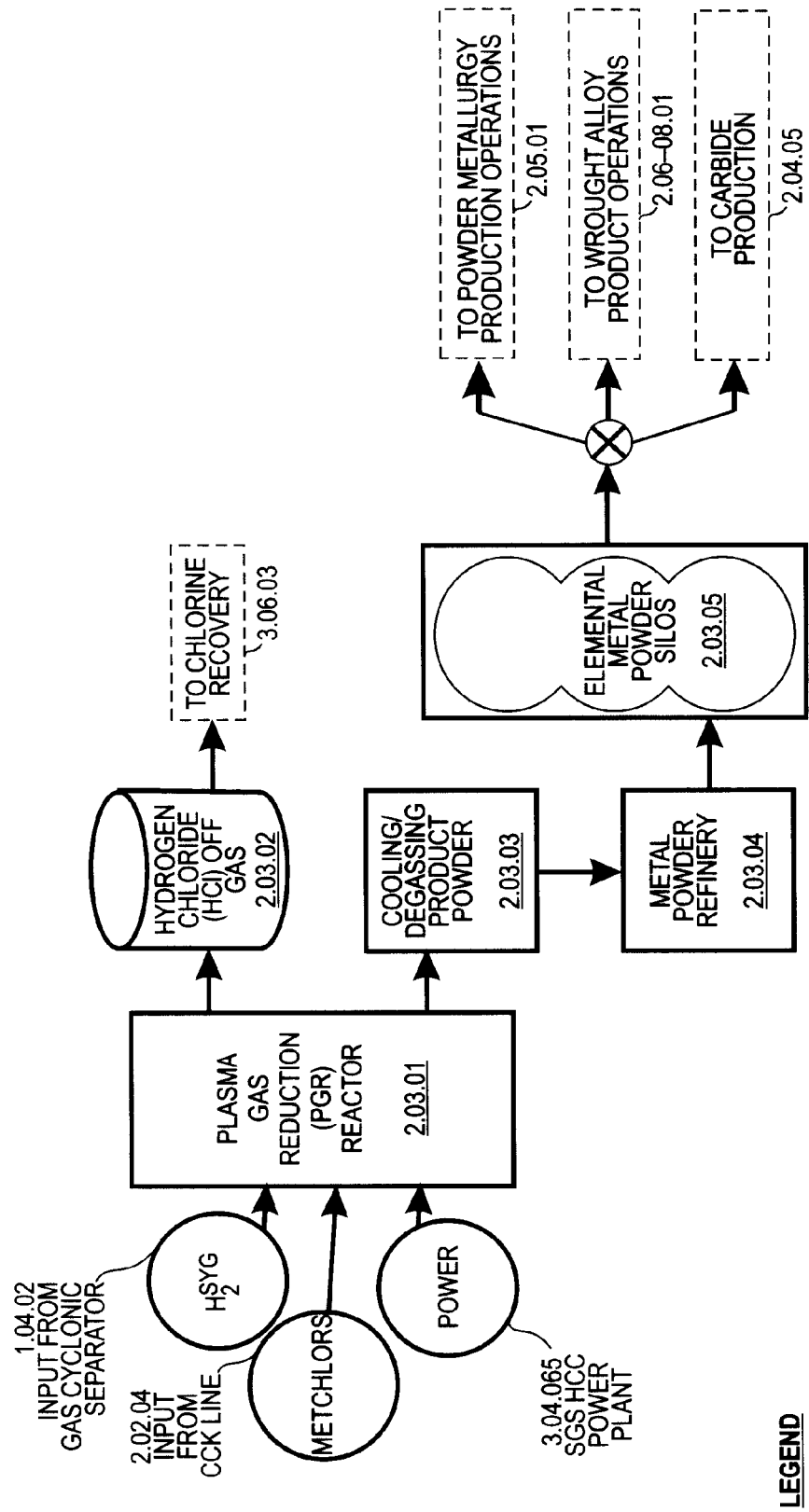
FIG. 2.03
SETMOR PRODUCTION
PGR METALLIC POWDER PRODUCTION SUBPROCESS

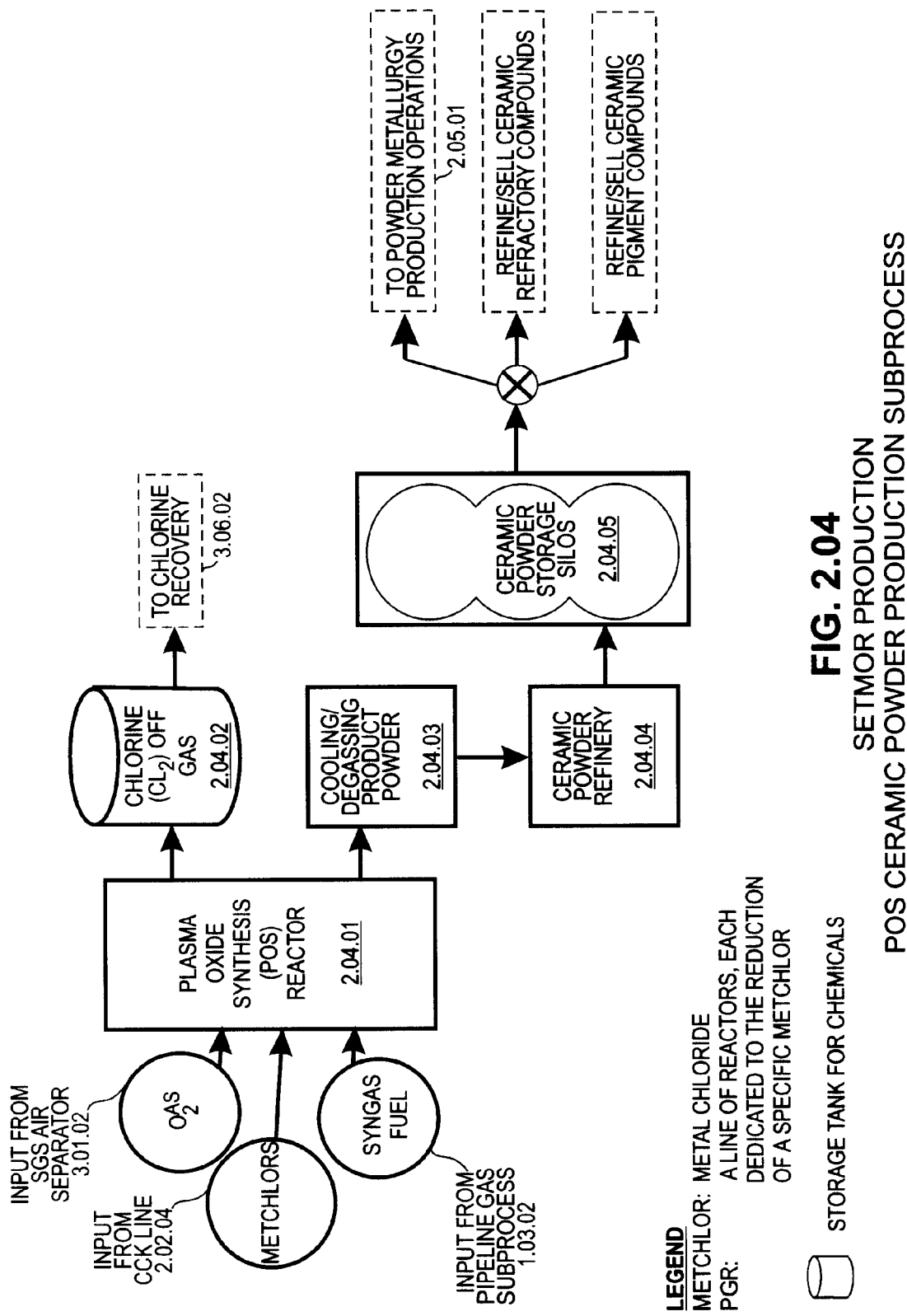
FIG. 2.04
SETMOR PRODUCTION
POS CERAMIC POWDER PRODUCTION SUBPROCESS

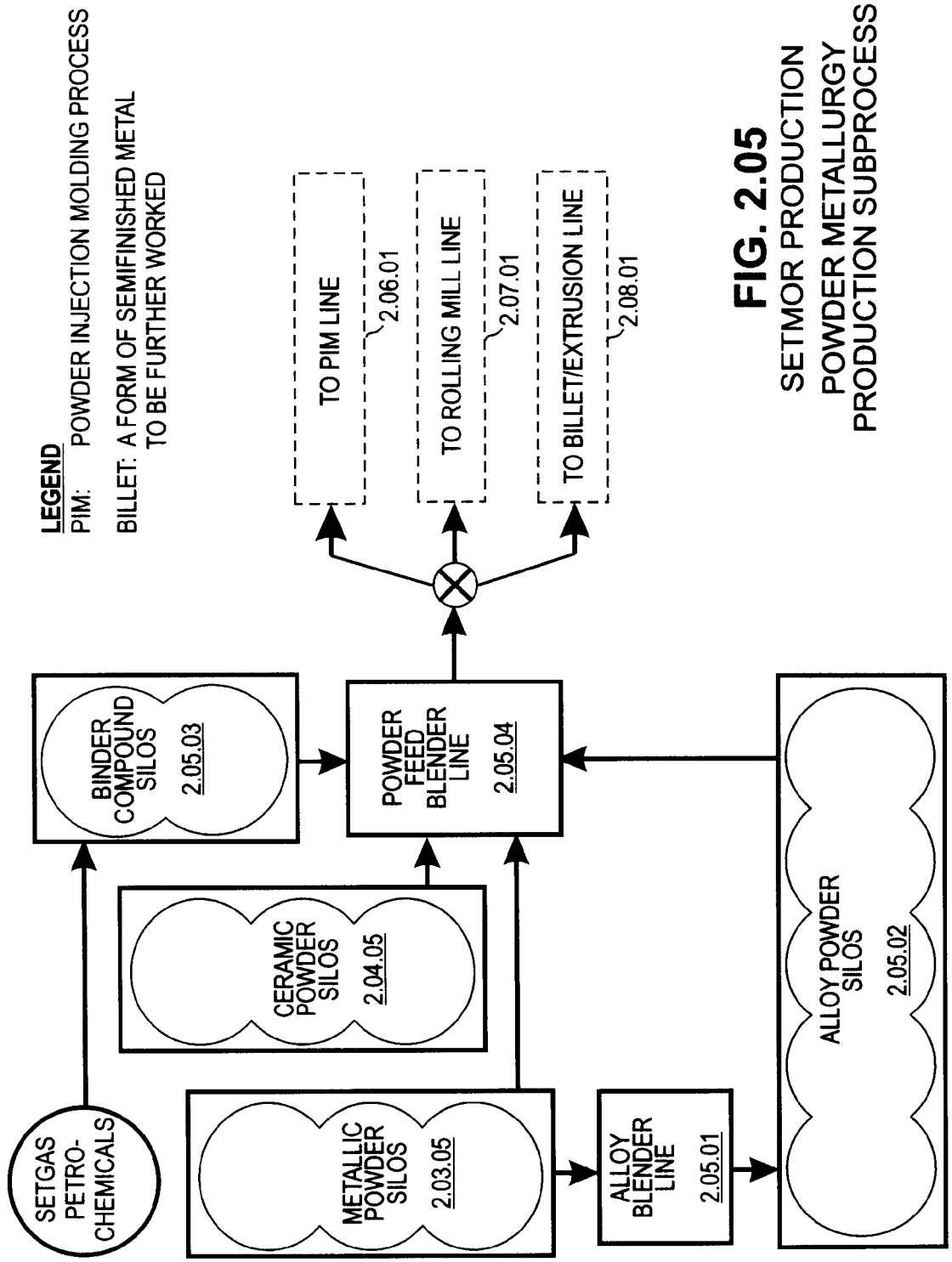
FIG. 2.05
SETMOR PRODUCTION
POWDER METALLURGY
PRODUCTION SUBPROCESS

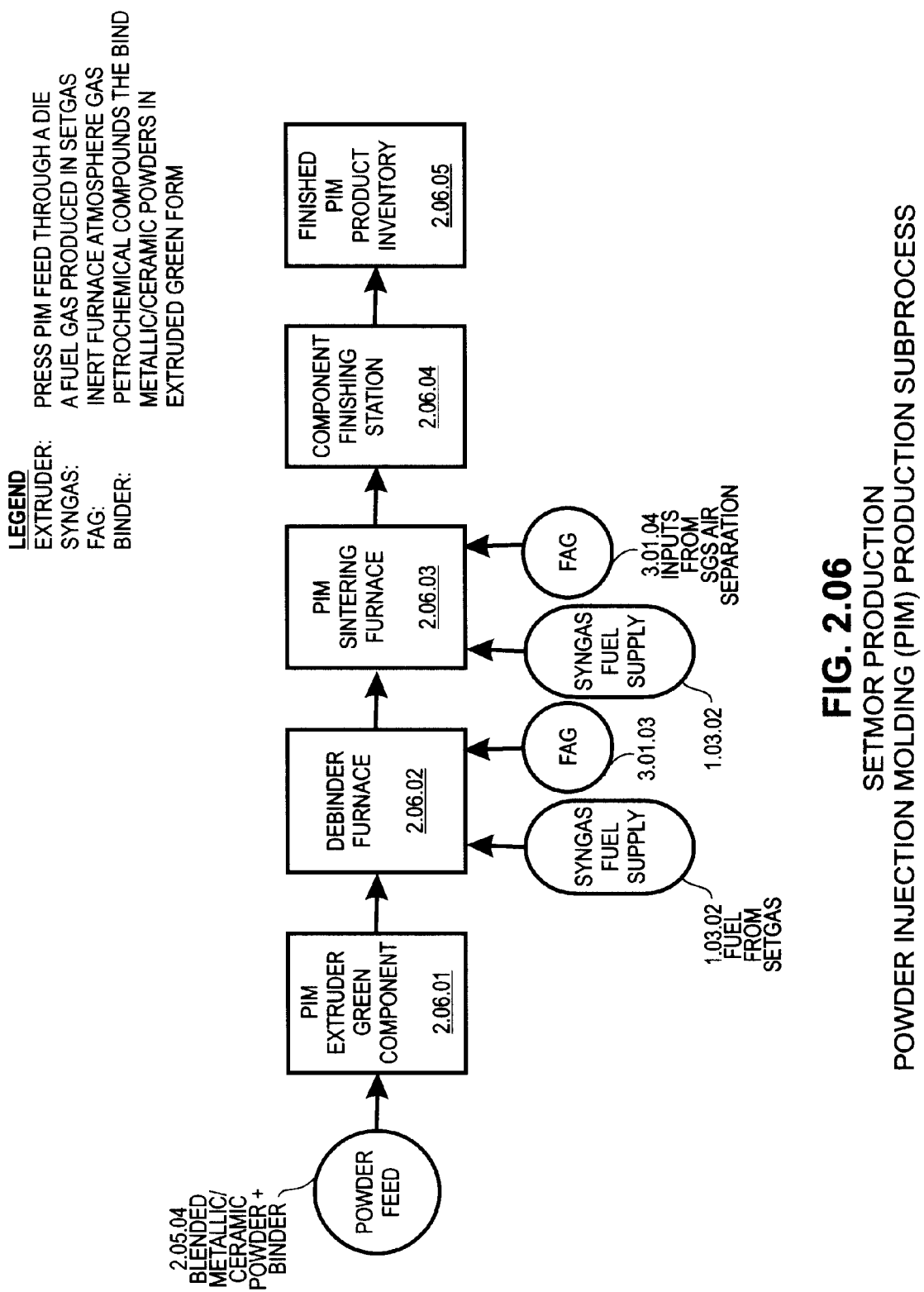
FIG. 2.06
SETMOR PRODUCTION
POWDER INJECTION MOLDING (PIM) PRODUCTION SUBPROCESS

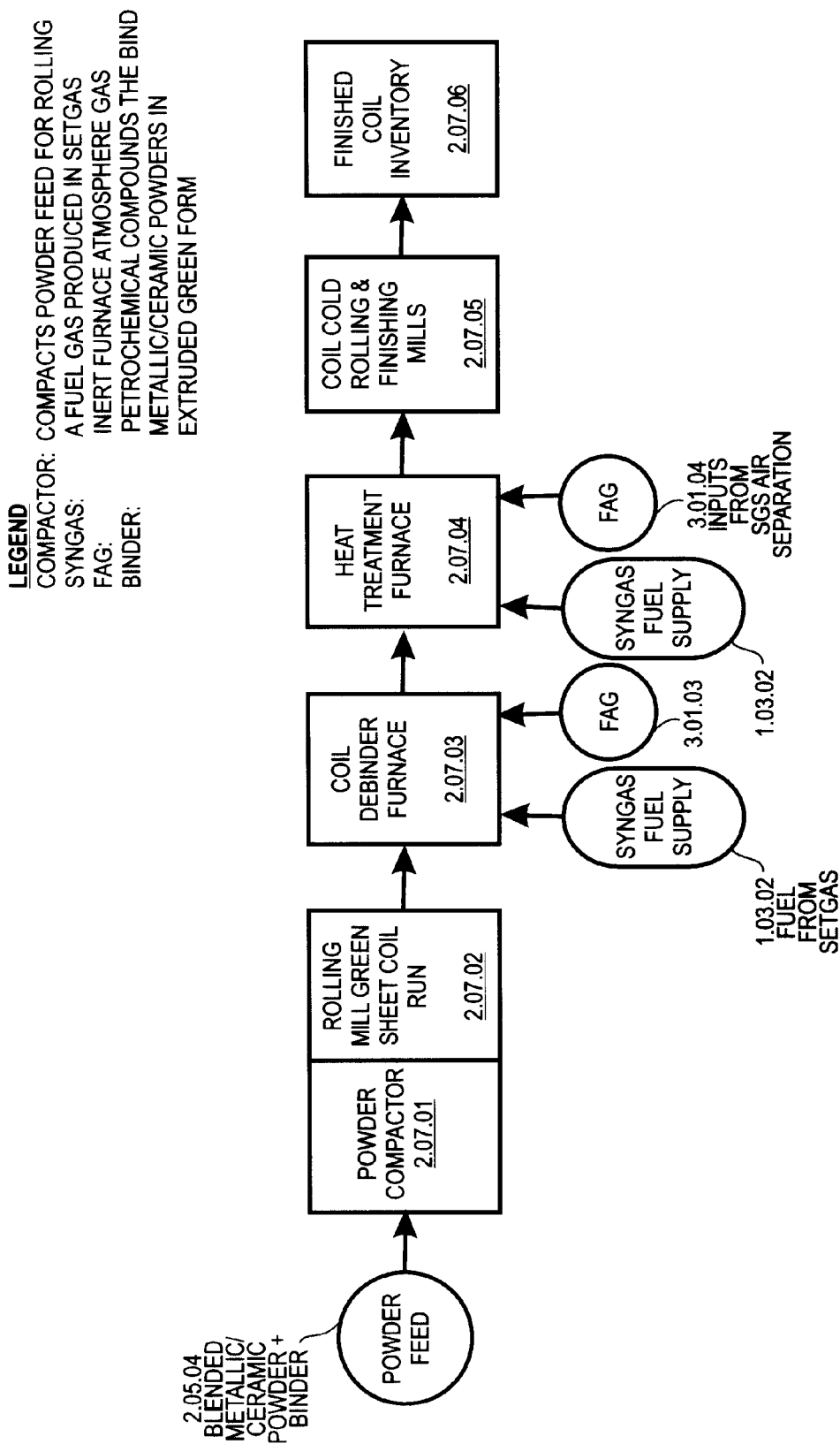
FIG. 2.07
SETMOR PRODUCTION
POWDER ROLLING MILLS PRODUCTION SUBPROCESS

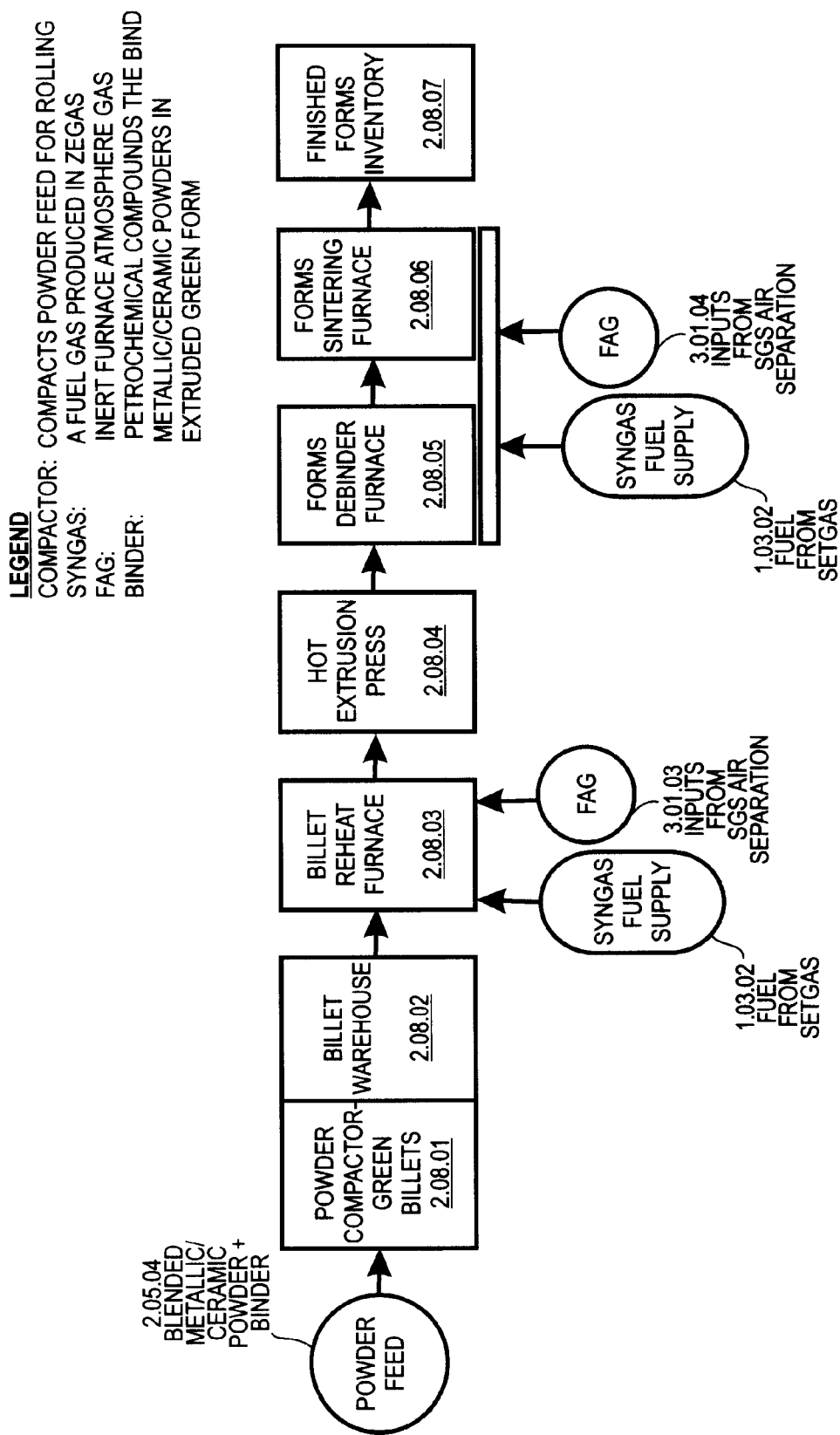
FIG. 2.08
SETMOR PRODUCTION
POWDER BILLET/EXTRUSION FORMS PRODUCTION SUBPROCESS

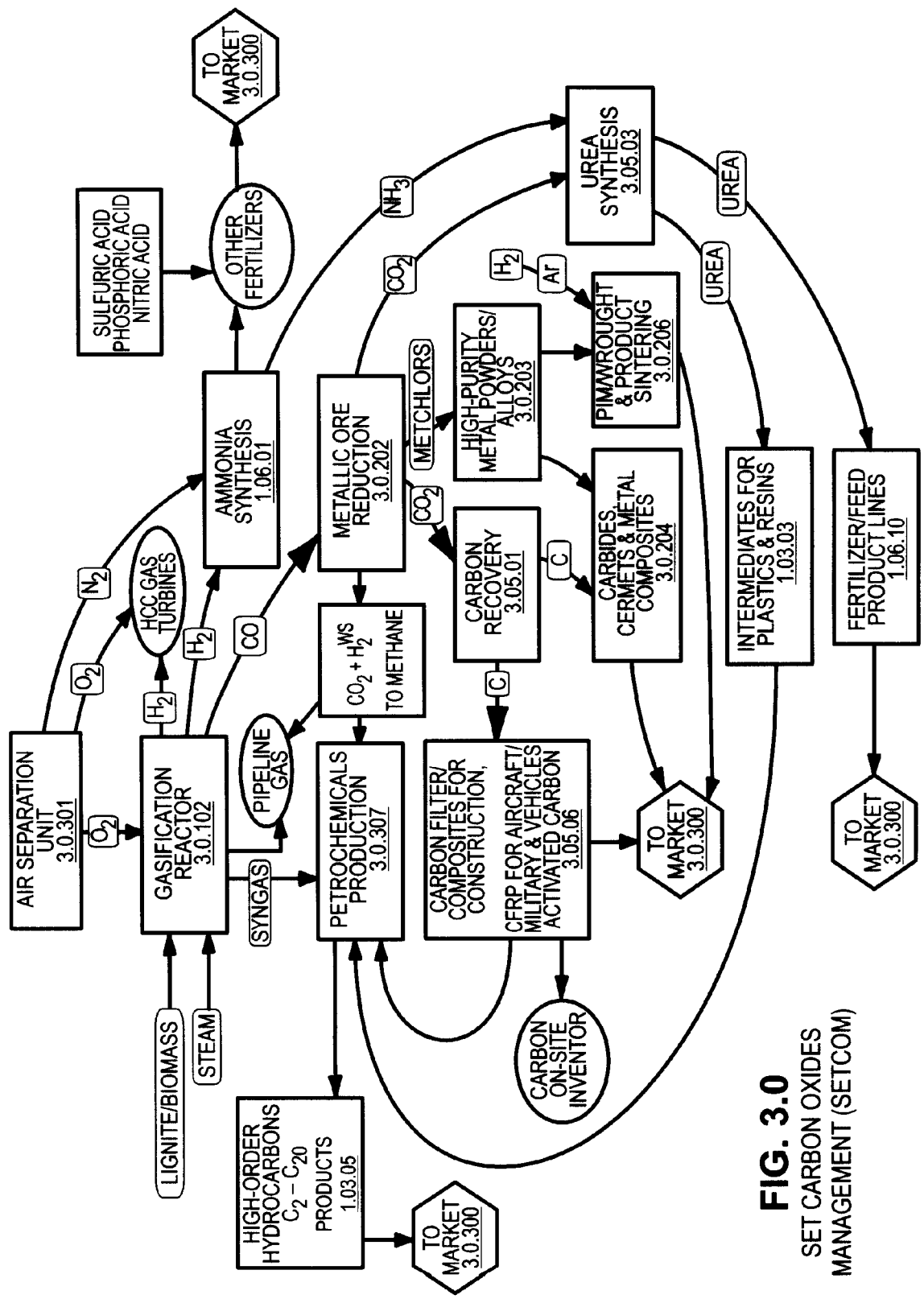
FIG. 3.0
SET CARBON OXIDES MANAGEMENT (SETCOM)

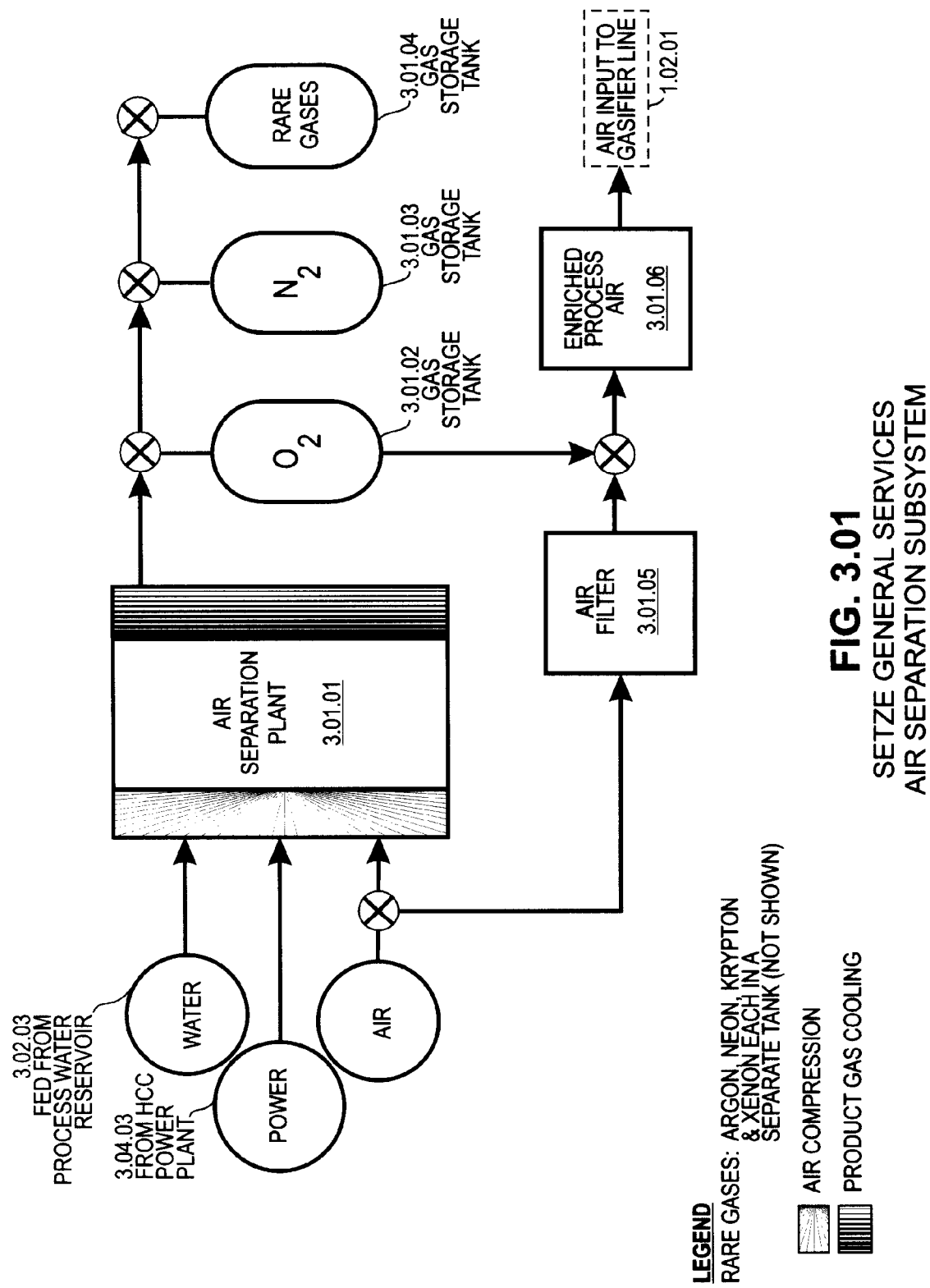
FIG. 3.01
SETZE GENERAL SERVICES
AIR SEPARATION SUBSYSTEM

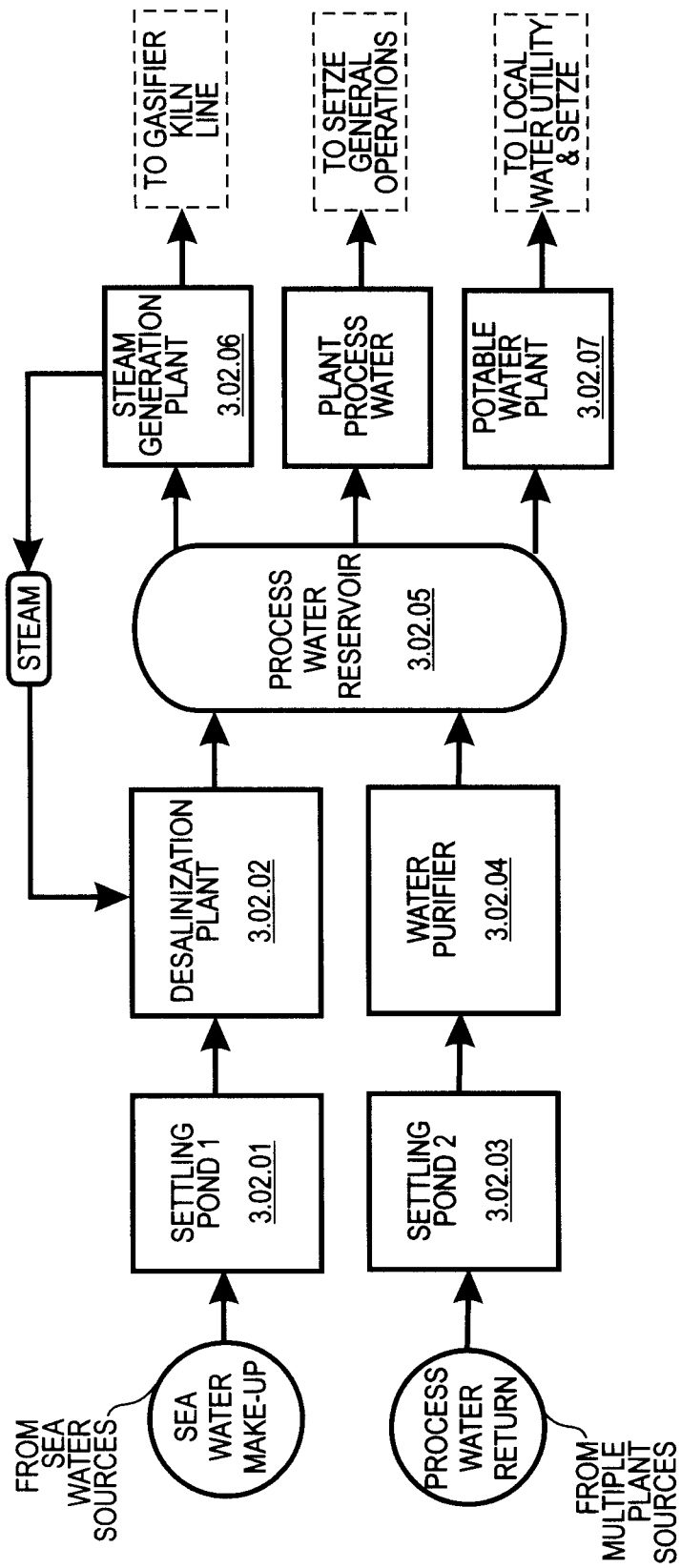
FIG. 3.02
SETZE GENERAL SERVICES
WATER/STEAM PROCESSING SUBSYSTEM

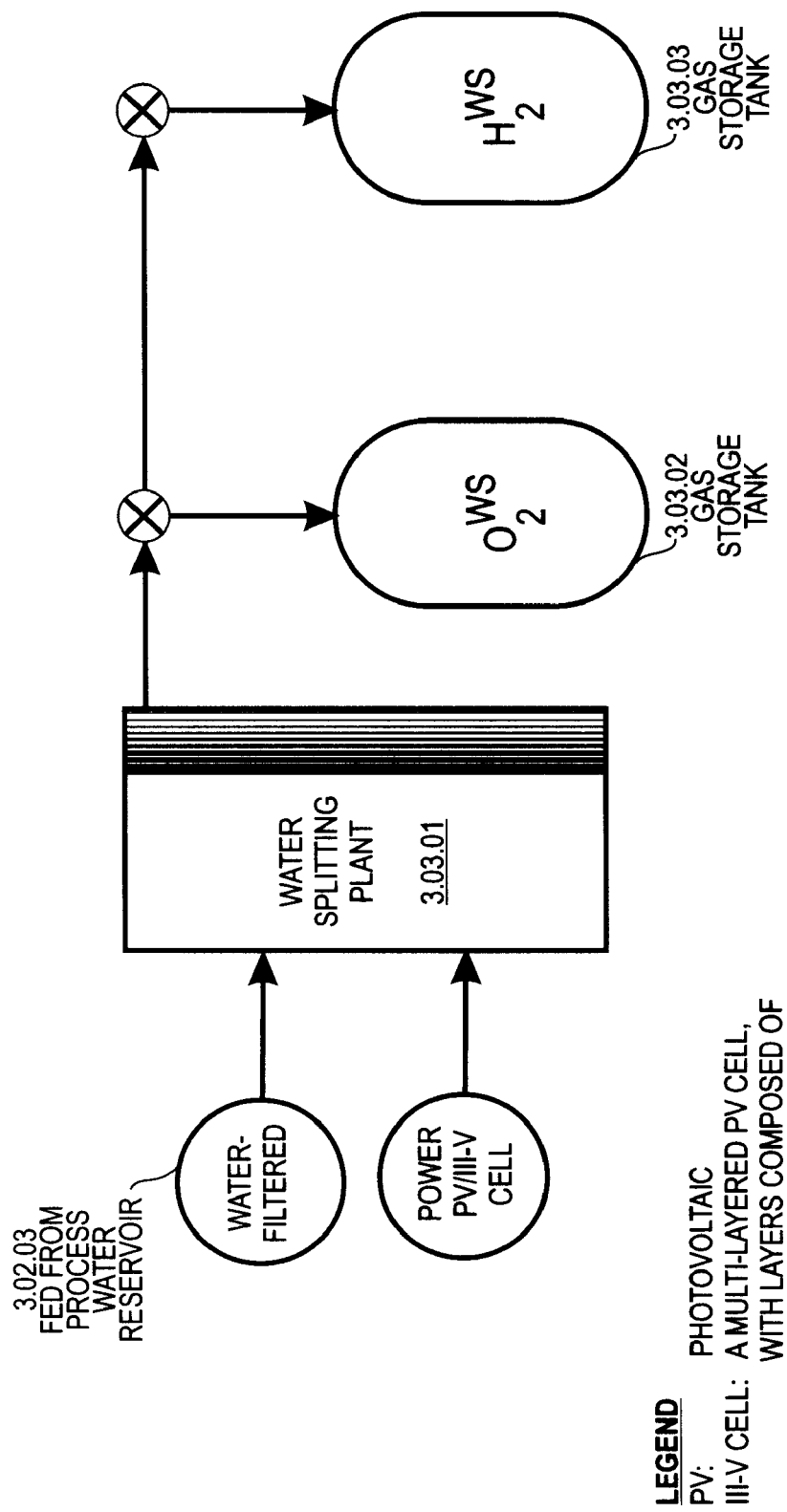
FIG. 3.03
SETZE GENERAL SERVICES
WATER SPLITTER SUBPROCESS

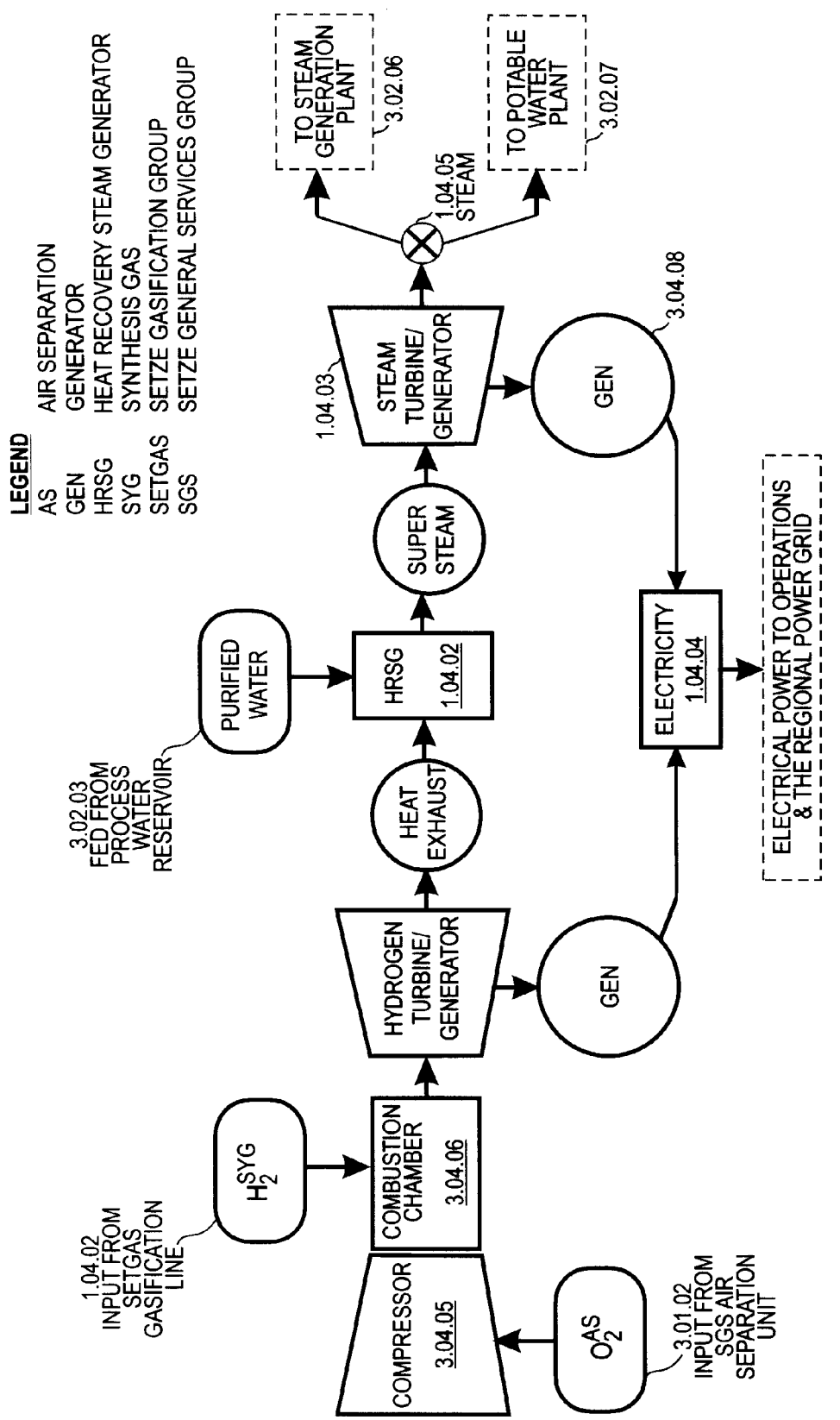
FIG. 3.04
SETZE GENERAL SERVICES
HYDROGEN/STEAM COMBINED CYCLE (HCC) ELECTRICAL POWER PLANT

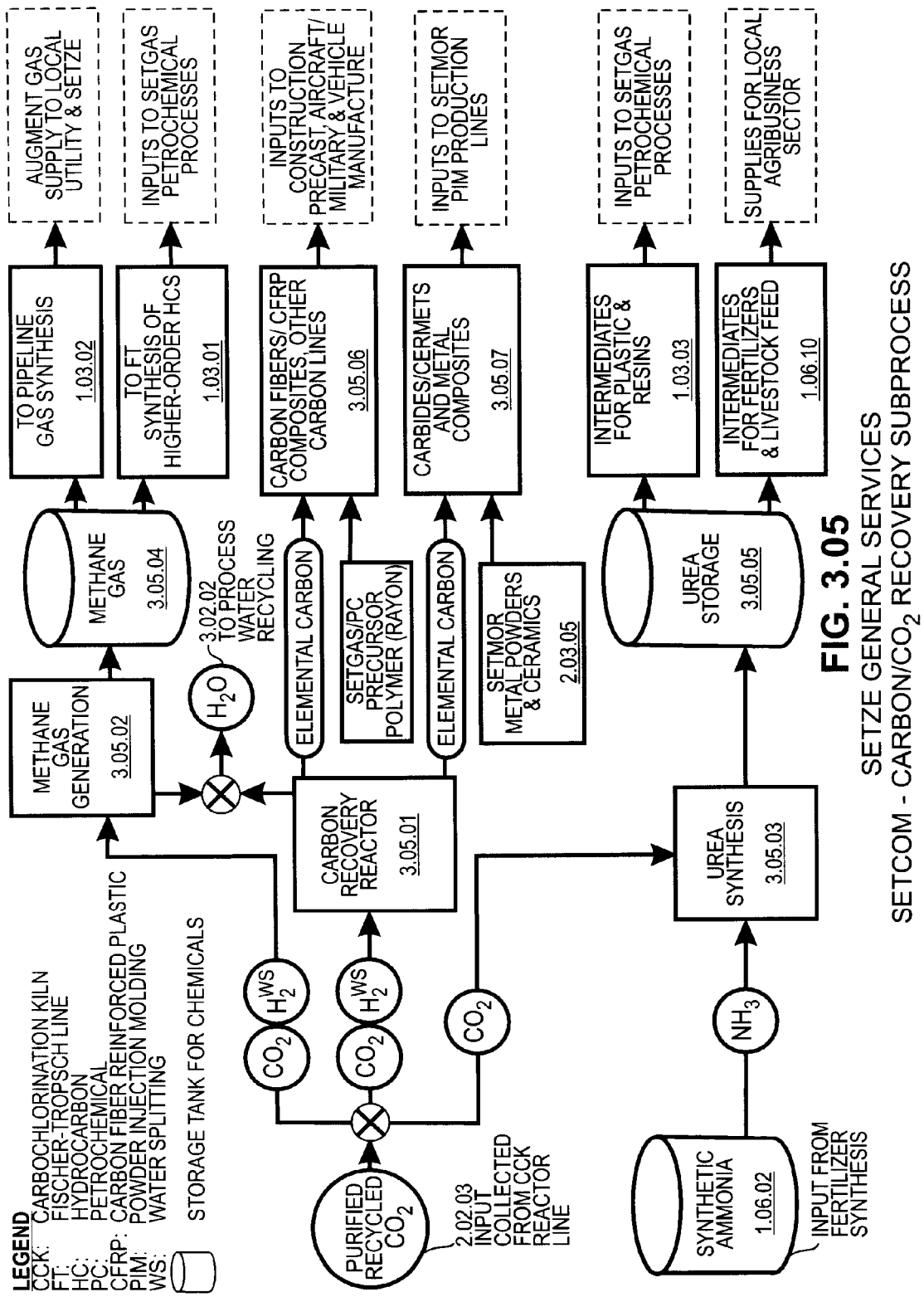
FIG. 3.05
SETZE GENERAL SERVICES
SETCOM - CARBON/$CO_2$ RECOVERY SUBPROCESS

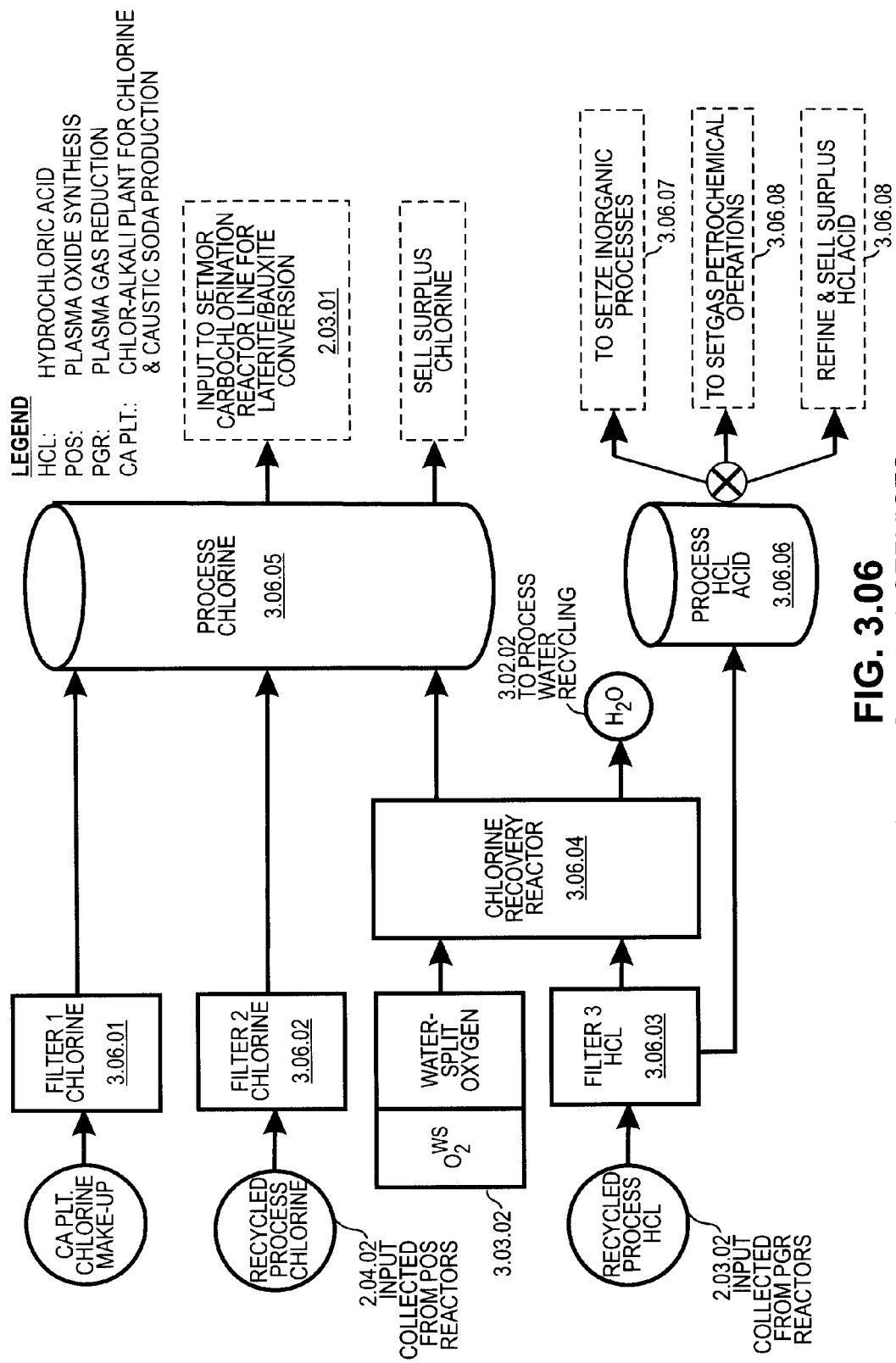
FIG. 3.06
SETZE GENERAL SERVICES
CHLORINE AND HCL RECOVERY SUBPROCESS

ZERO EMISSION GASIFICATION, POWER GENERATION, CARBON OXIDES MANAGEMENT AND METALLURGICAL REDUCTION PROCESSES, APPARATUS, SYSTEMS, AND INTEGRATION THEREOF

FIELD OF THE INVENTION

The present invention relates to improvements in unit processes through a synergy of: gasification of mineral fuels and available biomass to provide fuel for zero-emission power generation; production of high-purity metallic and ceramic powders from lower-grade metallurgical ores; and a management of carbon oxides generated in gasification and metallurgical ore reduction, that, when taken as an integral whole, produces several commodity metals at reduced cost and mitigates greenhouse gases while facilitating economic improvement.

BACKGROUND OF THE INVENTION

The Advent of Clean Coal/IGCC Power and the Retrofit/Carbon Capture Technology for Conventional Coal Power Plants At a time when the entire nation is grappling with the fundamentals of America's reformulation of its power generation system, the issues of clean coal power and the efficient disposal of greenhouse gas (GHG) are taking central roles. The growing impatience of the American public and its elected officials at every level, over the lack of a viable clean coal paradigm, is constantly in the public discourse and news media. It's broadly felt that developing cost-effective carbon capture technology is one of the most important environmental challenges facing the utility industry in the 21st century. This position was reinforced by the high-profile and historic February 2008 agreement between Texas Utilities (TXU), investment banks and environmental protection nonprofits. The resulting agreement caused a sea change in the coal power utilities sector, that dramatically increased public pressure for near-term, viable clean coal solutions.

The nationwide implementation of a large fleet of clean coal plants like the Integrated Gasification Combined Cycle (IGCC) power generation system, at any significant level, will take decades to achieve. Consequently, any viable national strategy for the early mitigation of GHG, must concurrently address the retrofit of the nation's existing 1,200-odd conventional coal-fired power plants towards the capture and efficient disposal of GHG.

Due to the massive tonnages of $CO_2$ and flyash created by the nation's 1,200-odd coal-fired power plants, there's clearly a need for emerging technology to focus on the disposal of these waste products in an economic manner to increase overall industrial efficiency and to profitably reduce the nation's carbon footprint. It is anticipated that such processes can help reduce capital outlays and operating costs for the carbon capture systems that are to come on stream shortly.

Currently, these new carbon capture systems anticipate disposal of captured $CO_2$ by geologic sequestration and/or enhanced oil recovery (EOR), reportedly at a node cost of $200 million, in a nationwide grid. Carbon sequestration is seen by those who favor it, as basis for a national grid to dispose of captured $CO_2$ emissions. There is the idea that such a grid will be capitalized by the federal government, as a public infrastructure project at an enormous cost to U.S. taxpayers. To the contrary, the present invention speaks to the key concerns of national leaders and major international bodies: how to mitigate greenhouse gas on a massive scale without heavily burdening the U.S. and global economies. To facilitate such disposal, retrofitted coal power plants must also incorporate costly $CO_2$-compression subsystems and pipelines. However, by switching to alternative disposal methods, as characterized by the present invention, the $CO_2$ compression, pipeline and storage steps may be obviated. The cost of carbon capture and disposal is thereby significantly reduced for such carbon capture systems (e.g., Alstom Power's Chilled Ammonia Process, and Babcock & Wilcox's Oxy-Coal Combustion method—said to be the two leading carbon capture processes). The operation of appropriate SETCOM units (as discussed below) adjacent to carbon capture retrofitted coal-fired power plants, can consume $CO_2$ and flyash generated by the utilities, generate thousands of urban and rural green collar jobs, and bring added value to the economy.

The introduction of viable clean coal power systems will move the nation towards long-lasting energy independence. Montana, at 120 Billion tons, has the largest recoverable coal reserves of any state in the nation, along with significant copper ore deposits. Applying the clean-coal power generation/clean metalmaking paradigm of the invention to Montana coal and copper ores, may provide a strategic step towards fulfillment of long-lasting US energy independence—a matter of immediate national concern, and one debated in the public discourse. The struggle of Montana to secure hard solutions in clean-coal power generation has been well characterized in the news media.

Rising energy costs related to natural gas have also caused great increases in the costs of agrochemicals, livestock feed, and foods, on a global basis. Because the present invention offers a lower-cost coal gasification pathway for the production of agrochemicals and livestock feed, long-term stabilization of food costs is possible, despite the price-volatility of natural gas.

The call for lower-cost pathways to ammonia and urea synthesis. With the precipitous contraction in U.S. nitrogenous fertilizer capacity and the increased cost of ammonia feedstock, driven by the volatile economics of U.S. natural gas, alternative production pathways are widely sought for ammonia. In sobering congressional testimony the warning was given that the U.S. natural gas crisis is a factor driving both the domestic and global energy and food supply crises. It was said that if the world's farmers stopped growing food today, we would only have enough grains in the world's storage bins to feed the world's population for 55 days; and that precursor natural gas accounts for 70 to 90 percent of the production cost of ammonia, and that fertilizers represent 40 percent of the global production cost of food. Due to the mounting cost of U.S. natural gas, 26 of 56 domestic nitrogenous fertilizer plants have closed since 2000, and consequently, 55 percent of nitrogenous fertilizer used domestically, is now imported with an adverse impact on U.S. food security.

The ammonia/urea, fertilizer and livestock feed production find alternative pathways rely on coal gasification and air separation in the present invention, rather than on traditional natural gas feedstock. A like alternative pathway for ammonia and fertilizer production is currently sought by Rentech in East Dubuque, Ill. at its IGCC facility. Previously, the feedstock for the East Dubuque ammonia plant was natural gas, but Rentech is now switching to Illinois coal as feedstock for the IGCC that, in turn, outputs purified syngas for that ammonia plant.

The Case for Lower-Cost Carbochlorination in Metallic Ores, Including Bauxite Reduction Over Traditional BHH, and the Promise of Metallic Powder Alloying for Performance-Critical Applications Due to rising concerns for global climate conditions and metals' supply and cost considerations, there's a general need for improved metallurgical processes that are cleaner and of lower cost. This is particularly true for major commodity metals like aluminum and copper. By way of example, the emerging role of improved metallurgical processes is nowhere more important than in increased fuel economy for the passenger vehicle.

To enable greater fuel economy in passenger vehicles, automakers are considering shifting to lighter, aluminum alloy intensive vehicles to reduce heavier steel content. As a general rule, every ten percent reduction in vehicle weight yields an eight percent increase in vehicle fuel economy. To affect such a shift to greater aluminum content on a substantial scale, global aluminum production would have to ramp-up significantly. However, since traditional BHH aluminum production releases nearly seven tons of carbon dioxide into the atmosphere for each ton of virgin metal, to avoid massive damage to the environment, one needs a low or zero-emission aluminum production process. The present invention answers this challenge to provide lower-cost zero-emission aluminum by introducing a new metallurgical process pathway together with the economic management of carbon oxide byproducts.

The traditional extractive processes of Bayer, Hall and Heroult (BHH), introduced in the 1880s, opened the way for the economical reduction of alumina (aluminum oxide) to aluminum. Over the next quarter century, North America's demand for aluminum and its alloys expanded so rapidly that North America's bauxite reserves were seen as nearing depletion. Further, with the massive jump in aluminum demand triggered by World War I (WWI), the allied forces viewed North American and European bauxite reserves, the traditional resources for alumina, as being dangerously insufficient. To meet this new metallurgical demand, in 1916-17, the United Kingdom and The Netherlands granted North American aluminum producers mining concessions in their respective bauxite-rich colonies in South America. This arrangement strengthened the hand of the allied forces in producing a range of newly emergent weapons and other military hardware. Later, as the global demand for aluminum continued to expand, North American producers such as Aluminum Company of America (Alcoa) and Alcan Aluminum Limited (Alcan) developed a permanent reliance on internationally available bauxite; an arrangement that helped the allied forces in WWII, and continues to support the global aluminum sector even today.

In 1825, Oersted passed chlorine over a mixture of alumina and carbon, and then condensed the product vapors to prepare the aluminum chloride salt. However, the second stage—the economic reduction of the metal-chloride, was never achieved by Oersted or his contemporaries. In the late 20th century, armed with the knowledge that the energy cost component of reducing aluminum chloride was a third less than that for reducing aluminum oxide, both Alcoa and Alcan attempted, unsuccessfully, to make Oersted's second stage work through the application of bauxite carbochlorination methods. The specific method employed unfortunately created the unmanageable process compounds known as chlorinated biphenyls and thwarted Alcoa's attempt.

By the 1960s, a metallurgical research and development unit at E.I. du Pont de Nemours & Co. had demonstrated that metallurgical powders subjected to wrought processes, such as rolling and extrusion, tested comparable to traditionally formed products from molten metals. It was concluded by du Pont that for many applications, direct metallurgical powder conversion of dendritically-shaped interlocking particles would have significant advantages. However, commercialization of the du Pont approach was and has been forestalled by an inability to produce sufficiently high-purity metal powders.

OBJECTS AND SUMMARY OF THE INVENTION

The present invention relates to a novel integration of certain technologies that will advantageously utilize domestic natural resources in the production of low-cost, alternative energy, preferably compliant with the United States Department of Energy ("DOE") Vision 21 standard, and chemicals/fertilizers, and to apply novel extractive metallurgy in the production of nanoscale powders and high-performance alloys from lower-grade metallurgical ores, and to improvements in the individual technology components and to benefits achieved by their integration. Going beyond the traditional links between metal refining and required power generation capacity, the collection of technologies are advantageously integrated in accordance with one aspect of the present invention, so that each technology component significantly enhances the environmental and economic performance of the other.

It is, therefore, an object of the present invention to achieve major economic uses for byproduct $CO_2$, including methane pool augmentation, carbon fiber for reinforcement of low-cost precast housing modules, carbon fiber reinforced plastics, urea synthesis that, in turn, supports fertilizer and livestock feed production, as well as plastic and resin production, and other volume uses of carbon oxides and elemental carbon.

It is another object to provide aluminum less expensively by providing lowered unit operating costs and energy requirements for the production of aluminum and other metals typically found in ore containing alumina (bauxite/laterite), independent of expected long-term price/supply volatility in market fuels.

The aspect of the present invention regarding the integration of technologies provides the following advantages.

GAME-CHANGING TECHNOLOGIES TO STRENGTHEN THE DOMESTIC ECONOMY—to program new technologies that offer to overcome impediments to clean energy while linking extractive metallurgy to the emergent nanoscale materials sector in domestic economies, located in close physical proximity where natural resources suitable for use in the present invention are situated.

EXPANDING DOMESTIC ENERGY OUTPUT—To create a new, inexpensive source of DOE Vision 21 compliant power and pipeline gas, to drive regional development of industry and employment; and to enable bulk hydrogen production through both a SETZE process (as defined herein) and 40% solar-cell water-splitting. Specifically, SETZE will use the new III-V photovoltaic ("PV") cell, which can generate electricity with up to 40% efficiency, thus producing cheaper hydrogen through water splitting ("WS") at a higher output rate, to make WS hydrogen that can be used in the recovery of elemental carbon from $CO_2$.

GREENHOUSE GAS MITIGATION—to achieve near zero or zero-emission power generation and $CO_2$-free strategic metal production with a SETZE carbon oxides management subprocess (SETCOM) by converting $CO_2$ into methane pool augmentation and elemental carbon for volume applications thereof, for example, forming carbon fiber for use in stronger/thinner precast building panels and in aircraft and automobile components.

EXPANDING DOMESTIC MINING/MINERAL ACTIVITY—to convert undervalued natural resources containing metal-bearing minerals and exotic trace metals to nanoscale powders for use in creating highly-priced end-products (including ultrahigh performance electronic materials).

The term "SETZE" as used herein refers to a zero-emission gasification, power generation and metal ore reduction process. It should be understood that the term "zero-emission" as used herein means and includes, but is not limited to, exactly zero greenhouse gas emissions as well as near zero, and emissions in an amount that would be considered acceptable to the environment in a practical implementation of the present invention. The SETZE process, and the production system for performing the process, concerns an integration of independent technology components (i.e., subprocesses) directed to gasification and metallurgy with carbon oxides management and power generation into a synergistic economic whole that provides the aforementioned advantageous economic and environmental benefits. More preferably, the SETZE process has three major technology components/processes, which are:

(1) Two-Step Gasification (also referred to herein as SET-GAS) for hydrogen and carbon monoxide production;
(2) Carbon Oxides Management (also referred to herein as SETCOM); and,
(3) Metallurgical Oxide Reduction (also referred to herein as SETMOR).

SETZE enables the straightforward management of byproduct carbon oxides that are produced in power generation and metal refining, as reflected by the embodiments described herein. It should be understood, however, that each of these technology components/subprocess forms an invention in its own right, apart from any benefit afforded from their integration. It also should be understood that although often referred to as a technology component, subprocess or process, each of the gasification (SETGAS), carbon oxides management (SETCOM) and metallurgy (SETMOR) technology also refers to a module or facility having apparatus and structures and process for performing the corresponding described functions and processes and reactions, and systems therefor.

A green (i.e., environmentally friendly) technology, SETMOR works in tandem with the SETGAS coal/biomass gasification which in turn fuels (with oxygen) a power plant such as a gas-turbine unit of a Hydrogen Combined Cycle ("HCC") power generation system. In the SETGAS gasification technology, the carbon monoxide (CO) byproduct is preferably stripped away using cyclonic gas-gas separation, and piped to a carbochlorination kiln line of the adjacent SETMOR unit. This significant step leaves behind pure hydrogen fuel (another byproduct of the gasification process) for use in HCC zero-emission power generation, while consuming CO as a substitute for the normally used, but polluting and energy-costly coke—the traditional oxygen sink in a carbochlorination process for aluminum production.

Unlike traditional BHH smelting, the SETMOR process of the present invention eliminates the release of greenhouse gases through interaction with the SETCOM technology, and through the redirection of elemental carbon (a byproduct) to large-volume applications that convert elemental carbon into economic intermediates. For SETMOR aluminum production, a comparative analysis of standard energies of formation, as discussed below, shows a superior energy efficiency for SETMOR over the traditional BHH process.

Advantageously, the SETMOR technology reorders the cost structure of metallurgical extraction and revalues bauxite/laterite ore bodies as consumable natural resources. The SETMOR mining paradigm is defined by the extractive metallurgy techniques employed downstream, and the calculation of the ore deposit value is based upon that process. This novel method effectively increases bauxite/laterite reserves by economically processing lower-grade metallurgical and refractory grade ores. In contrast, the BHH monoprocessing of alumina/aluminum necessarily excludes lateritic ores, accepting only higher-grade aluminous ore feeds while discarding the remaining valuable metal-oxides (e.g., titania, zirconia and gallium oxide) as waste byproducts in process tailings ponds. Hence, the concurrent multiprocessing of numerous economic metals using the SETMOR technology, reduces the cost burden on the production of alumina/aluminum, and iron by distributing the cost of mining and processing over the family of economic metals found in the ore.

Additionally, SETMOR has the capacity to process massive deposits containing many billions of tons of so-called "off-spec" (or, out-of-specification) bauxite (e.g., aluminous laterite) in the American Southeast as well as in Africa, Asia (India, specifically, has known, large laterite deposits) and South America (Northeastern region). Lateritic bauxite cannot be handled by the conventional BHH method of the world's major aluminum producers.

By way of example, in the 1960s it was discovered that Mali embraces a lateritic bauxite region that covers 270 miles with an estimated one billion metric tons of ore. Unfortunately, due to the low alumina and high-iron content of much of Mali's bauxite, it is seen as subeconomic by criteria of the traditional BHH extractive process. Therefore, major aluminum producers are forced to avoid such deposits. Due to major investment over many decades, the aluminum majors are firmly tied to the old BHH productive assets. Accordingly, it's believed the aluminum majors can't easily reorganize to handle the lateritic bauxite exemplified by Mali's deposits, and found in other aforementioned regions. Consequently, the advent of the SETMOR process may permit substantial new laterite/aluminum business that's only marginally competitive, and due to the limits of prevailing technology, has gone unexploited.

In this manner, massive ore bodies with relatively lower levels of alumina, such as laterites, become economically viable reserves. Given how such resources are often located in underdeveloped rural areas, the present invention in a preferred embodiment provides an integrated system that provides and promotes economic development in those rural areas, raising the standard of living and enhancing the well-being of the residents.

Gasification (SETGAS):

Broadly, one aspect of the present invention is directed to improvements in a two-step carbonaceous source gasification method for bulk hydrogen that avoids the precombustion formation of $CO_2$ and obviates the traditional water gas shift (WGSR) step. In one embodiment, the two-step gasification includes using a step-1 rotary kiln gasification process. In another embodiment, the two-step gasification includes a step-2 gas-gas cyclonic separation process. More preferably, the gas-gas cyclonic separation process directly separates synthesis gas into purified hydrogen and purified carbon monoxide. Advantageously, this process makes available purified bulk carbon monoxide for use in metallurgical reduction, and purified bulk hydrogen as fuel for an emission-neutral hydrogen combined cycle (HCC) turbine power generation station.

Metallurgical Reduction (SETMOR):

Broadly, another aspect of the invention is directed to an ore carbochlorination method for the production of metals found in the metallic components of the ore, that utilizes carbon monoxide as an oxygen sink, rather than the traditional coke. Advantageously, use of carbon monoxide circumvents the formation of the chlorinated biphenyls and other coal compounds that had thwarted earlier attempts at bauxite ore carbochlorination. As noted, this improved carbochlorination method is preferably integrated with: a) a process for the concurrent separation and purification of all metal-chlorides (metchlors) and capture of $CO_2$ for passage to the carbon oxides management system (SETCOM); b) a process for the direct reduction of metchlors to nanoscale metallurgical powders and/or to dendritically-shaped particles, including metchlor reduction for the ultrahigh-performance semiconductor metals of the III-V group; and, c) a process for the reforming of metal-oxides with plasma-formed crystalline structure from metchlors. This aspect of the present invention is particularly applicable to bauxite and/or lateritic ore carbochlorination to produce aluminum and other metals found in the metallic components of the ore, and carbochlorination of copper-bearing ores that produce copper and other metals found in such ores.

In a preferred embodiment, the carbochlorination in accordance with the present invention includes using a rotary kiln reactor in the carbochlorination process with reactant carbon monoxide as a clean oxygen sink; and the heterogeneous output of the rotary kiln is passed to a manifold fluidized bed reactor (MFBR) for the separation of the heterogeneous metchlor stream output into a plurality of homogeneous metchlor streams corresponding to the different metal components of the ore being processed, and $CO_2$ and other byproducts. Preferably, the MFBR also performs a purification of the homogenous metchlor streams.

Preferably the SETMOR subprocess uses a plasma gas reduction (PGR) process for the conversion of metchlors to nanoscale metallurgical powders and other intermediate forms. In another embodiment, SETMOR subprocess uses plasma oxide synthesis (POS) to reform bauxite metal-oxide with an improved crystalline structure from the intermediate metchlors. Advantageously, the SETMOR subprocess simplifies production and reduces costs for exotic III-V group metals from bauxite, which exotic metals are suitable for use in ultrahigh-performance semiconductor devices.

Carbon Oxides Management (SETCOM):

Broadly, yet another aspect of the present invention is directed to carbon oxides management (SETCOM) that eliminates major impediments to emission-neutral power generation and the reduction of major metals. The SETCOM method collects, stores and directs to points of usage, carbon oxides that arise in various SETZE processes. The SETCOM method preferably captures carbon monoxide for process enhancement and economic uses. Ultimately, the SETCOM method captures carbon dioxide as a process intermediate and for economic uses. For example, in one preferred embodiment captured carbon monoxide is passed through the SETCOM method to a bauxite ore carbochlorination line for consumption in the production of aluminum and other metals in bauxite. Further, in the SETCOM method captured $CO_2$ is consumed in a number of volume applications that dispose of it in a green economic fashion. Advantageously, the present invention obviates the need for $CO_2$ sequestration, which has been found to be a questionable remedy.

BRIEF DESCRIPTION OF THE DRAWINGS

Further features, advantages and characteristics of the present invention will become apparent to a person of ordinary skill in the art from the following detailed description of preferred embodiments of the present invention, made with reference to the annexed drawings, in which like reference numbers refer to like elements, and in which:

FIG. 1 is a schematic drawing illustrating the SETZE integration of: SETGAS—Gasification and Petrochemicals; SETMOR—Metallurgy and Ceramics; and SGS—SET General Services, which includes SETCOM—Carbon Oxides Management;

FIG. 1.01 is a schematic drawing of a Gasifier Feed Preparation Process Subsystem;

FIG. 1.02 is a schematic drawing of a Coal-Biomass Gasification Process;

FIG. 1.03 is a schematic drawing of a Fischer-Tropsch Hydrocarbon Reformer & Pipeline Gas Subsystem;

FIG. 1.04 is a schematic drawing of a SYG Gas-Gas Cyclonic Separation Subprocess;

FIG. 1.05 is a schematic drawing of a Sulfur Intermediates' Production Subprocess;

FIG. 1.06 is a schematic drawing of a Chemical Fertilizer Synthesis Subprocess;

FIG. 2.01 is a schematic drawing of a Carbochlorination Kiln Feed Preparation Subsystem;

FIG. 2.02 is a schematic drawing of a Bauxite Carbochlorination/MFBR Process;

FIG. 2.03 is a schematic drawing of a PGR Metallic Powder Production Subprocess;

FIG. 2.04 is a schematic drawing of a POS Ceramic Powder Production Subprocess;

FIG. 2.05 is a schematic drawing of a Powder Metallurgy Production Subprocess;

FIG. 2.06 is a schematic drawing of a Powder Injection Molding (PIM) Production Subprocess;

FIG. 2.07 is a schematic drawing of a Powder Rolling Mill Production Subprocess;

FIG. 2.08 is a schematic drawing of a Powder Billet/Extrusion Forms Production Subprocess;

FIG. 3.0 is a schematic drawing of a SET Carbon Oxides Management (SETCOM);

FIG. 3.01 is a schematic drawing of an Air Separation Subsystem;

FIG. 3.02 is a schematic drawing of a Water/Steam Processing Subsystem;

FIG. 3.03 is a schematic drawing of a Water Splitter Subprocess;

FIG. 3.04 is a schematic drawing of a Hydrogen/Steam Combined Cycle (HCC) Electrical Power Generation Plant;

FIG. 3.05 is a schematic drawing of a SETCOM—Carbon/CO Recovery Subprocess; and FIG. 3.06 is a schematic drawing of a Chlorine and HCl Recovery Subprocess.

The reference numbering in the drawings is hierarchical and is assigned a three-level nomenclature (group number, serial figure number, element number). The group number is one of 1, corresponding to SETGAS, 2 corresponding to SETMOR, and 3 corresponding to SETCOM. The serial figure number corresponds to a subprocess/module within the given group. Specifically, FIGS. 1.0-1.06 correspond to a process flow chart and apparatus for the SETGAS technology, FIGS. 2.01-2.08 correspond to a process flow chart and apparatus for the SETMOR technology, and FIGS. 3.01-3.06 correspond to a process flow chart and apparatus for the SETCOM technology. The element number is a specific element within a given subprocess. Thus, element 3.05.02 refers to element 02 in FIG. 3.05, where FIG. 3.05 is a process flow chart within group 3, i.e., SETCOM, although element 3.05.02 may also appear in other Figures, referring to the same element.

DETAILED DESCRIPTION OF THE INVENTION

With reference to the drawings, the SETZE system in accordance with a preferred embodiment of the invention integrates through the technology modules for carbon oxides management 3, gasification operations 2 with a unique metallurgical reduction process 2 to concurrently yield zero-emission gasification outcomes and reduced-cost metallurgy for major metals and exotic trace metals found in bauxite/laterite.

Broadly, the SETZE System is a mix of technologies, inputs and activities resulting from the gasification of a carbonaceous source, metallurgical reduction of an ore containing a plurality of metallic components (e.g., metal oxides) in its composition, and carbon oxides management subprocesses. It should be understood that conventional air separation and raw sea water processing techniques are to be included in any implementation of the appropriate aspects of the present invention as they provide a source of oxygen and purified process water/steam for the gasification operation and power generation system. These features and their integration are well known to and within the abilities of persons of ordinary skill in the art.

With reference to FIG. 1.0, the SETZE Integral Process exhibits the integration of SETGAS—Gasification and Petrochemicals 1, SETMOR—Metallurgy and Ceramics 2, and (SGS) General Services 3, that include the SETCOM Carbon Oxides Management 3.05 (a Carbon/$CO_2$ recovery subprocess). As noted, each technology component (process and/or facility) reflects inventive aspects, whether considered separately or jointly, each advantageously serving to enhance the efficiency of the other. SETGAS receives methane and intermediate carbon compounds from the SETCOM subprocess 3.05, and outputs carbon monoxide 2.02.01 to SETMOR 2 (See FIG. 1.04). The SFTCOM subprocess 3.05 (see also FIG. 3.05) in turn receives carbon monoxide 2.02.01 and also carbon dioxide 2.02.03 from the metallurgical subprocess 2 (FIG. 2.02), and in turn outputs carbon monoxide and elemental carbon to the metallurgical subprocess 2, and outputs elemental carbon that is in turn converted to large volume carbon applications that are sent to the market 3.05.06. The metallurgical subprocess 2 (FIG. 2.02) in turn, receives carbon monoxide and elemental carbon, and converts them to a carbon dioxide 2.02.03 in a zero-emission conversion process. The gasification process also generates a clean burning fuel 1.02.03 used to drive an emission neutral power plant such as an HCC generator.

This approach eliminates a major hurdle heretofore existing in an effort to obtain zero-emission power generation: the efficient disposal of byproduct carbon oxides. This long-term problem in the art is now overcome in accordance with this one aspect of the present invention, by expanding the realm of integration beyond energy-sector technology modules to provide proximately located collateral industrial processes that routinely consume carbon oxides on a suitable volume basis. Preferably, the proximate collateral industrial process includes a carbochlorination unit of the metallurgical subprocess 2 (FIG. 2.02) that will preferably consume a large volume, e.g., half, of all carbon monoxide (CO) produced by the gasification subprocess 1 (FIG. 1.04). This use of CO as a source for carbochlorination in turn has the strategic advantage of eliminating the need to acquire costly coke as an input to the carbochlorination process, as exists with conventional carbochlorination processes. The gasification subprocess I (FIG. 1.04) can then amass hydrogen, a product that when separated from the CO, can be provided as a clean burning fuel for the HCC power generation.

With reference to FIG. 2.02, the use of CO 1.04.03 as a reactant in metallurgical reduction of ore 2.02.01, produces $CO_2$ 2.02.03 which is then conventionally treated in carbon recovery unit 3.05.01, which reacts $CO_2$ with $H_2^{ws}$ (e.g., H, from water-splitter) to recover elemental carbon for reuse, while producing byproduct water (to be recycled in subprocess 3.02.02 and deposited in the process water reservoir 3.02.05 for reuse). The $CO_2$ byproduct is advantageously neither released into the air, nor piped hundreds of miles for enhanced oil recovery (EOR) or sequestration—two costly and questionable remedies conventionally used and/or contemplated by many major gasification operators/planners to contain the $CO_2$ production byproducts due to important environmental concerns. Instead, in accordance with the integrated SETZE System, in a facility located in close physical proximity to the SETMOR process 2 that produces the $CO_2$, carbon oxides produced are managed in a closed cycle that is environmentally friendly.

With reference to FIG. 3.05 examples of large volume applications targeted for consuming recovered carbon or byproduct carbon dioxide, are: forming carbon fibers/composites for use in precast panels for building construction 3.05.06; forming methane (e.g., by a synthesis of $CO_2$ and $H_2$) 3.05.02, and 3.05.04, e.g., for use as a petrochemical feedstock 1.03.03; and forming urea (synthesis of ammonia and $CO_2$) 3.05.03, e.g., for use in fertilizers, livestock feed 3.05.05, and resins and plastics 1.03.03.

Also, elemental carbon produced in SETCOM 3 can be used as input to produce carbides, e.g., tungsten carbide (WC) and silicon carbide (SiC); and composites like alumina silicon carbide ($Al_2O_3$—SiC), and tungsten carbide nickel (WC—Ni) 3.05.07.

Indeed, to economically consume the bulk of byproduct as an alternative to costly sequestration, an array of high-volume $CO_2$ consumption applications may be employed. One such application as noted is to convert $CO_2$ to carbon-fiber reinforced precast concrete modules. As the tragic 2005 hurricane season in the Southeast United States closed, many pondered the need to introduce lower-cost storm-resistant building designs for residential and commercial construction and reconstruction in hurricane zones. Due to the generous availability of aggregate in the region and the ample supply of the near-giveaway byproduct fly-ash from regional coal-fired power plants, this area offers a solution through creation of fly-ash concrete precast production facilities using carbon-fiber/epoxy reinforcement materials that are made using the $CO_2$ 2.02.03 produced by the metallurgical subprocess (FIG. 2.02).

For many decades, the growing acceptance of flyash usage has been demonstrated by major building projects for office and residential purposes. Flyash cement is ASTM-listed and approved as a mineral admixture for use in mortar, patching, and structural concrete. Such projects include the famous Sears Tower office building and Water Tower Place, both in downtown Chicago. Completed in 1975, Water Tower Place on North Michigan Ave., is a 75-story retail/commercial/hotel/residential mixed-use complex. Also, on the international side, the channel link between England and France, and in Asia, the Petronas Twin Tower in Kuala Lumpur (one of the tallest office buildings in the world), were built using massive amounts of flyash. Based on the Kyoto Accords and the Chicago Climate Exchange, high usage of flyash in concrete is now a component for carbon credits trading.

Further, it is reported that the replacement of steel reinforcement in precast by carbon-fiber, reduces panel weight by 66% and thickness by 33%, while increasing strength 7-told. See e.g., Carboncast, http://compositesworld.com/ct/issues/2005/April/808/2/.

Another application is to convert $CO_2$ into fertilizers, water and food production—materials that it is estimated the world would need to increase by 60% by the year 2050—using, for example, existing technology and facilities. At a time when the cost of fertilizer and other food production elements are tracking upward with the price of crude petroleum, long-term global demand for food and water is also mounting with world population growth. Increasingly, over the coming decades the global market values of fertilizers, livestock feeds, potable water and basic food stuffs is expected to jump. Accordingly, the siting of river-water purification against the SETZE HCC power plant (which is preferably located on or near to a river or other water supply for direct access to water for cooling) will boost the total water supply, which, together with increased chemical fertilizers and livestock feed output in the vicinity, will enable domestic agribusiness to flourish in an economically reasonable manner. As discussed below, salt water sources accompanied by a desalinization plant also can be used to expand the applicability of the present invention.

These carbon converting applications for consuming recovered carbon and converting $CO_2$ to produce commercially valuable and marketable products are illustrative and in and of themselves well known to persons of ordinary skill in the art and do not form any inventive aspect of the present invention and, therefore, will not be discussed further in detail. The inventive aspect of these applications is that by using one or more of them integrated in the SETZE system the generation of, and the cost and burden of capturing and storing, greenhouse gases, can be minimized, if not entirely avoided. It should be understood that one or more of the available carbon consuming and/or converting applications may be used as needed, together with other raw materials, to consume the $CO_2$ to manufacture useful, marketable products.

Advantageously, SETMOR 2 also produces an end product that includes a virgin form of metals in the form of nanoscale metallic powders, such that high-density alloys can be formed directly from a mechanical blending of such powders, as illustrated in FIG. 2.05. This provides an improvement over traditional alloying which involves ingot/billet remelts and solves the problems that have confounded those skilled in the art attempting to exploit the du Pont discovery of wrought processing of particulates. Another advantage to the metallurgical subprocess illustrated in FIG. 2.03 is that it overcomes the problem of immiscibility with the nanoscale metallic particles it produces that makes it possible to create intermetallic compounds, for example, the intermetallic silver tungsten (AgW)—in the class of conductive refractories.

Gasification provides the greenest, most economic method of producing synthesis gas ("syngas" or "SYG") from many carbon-based ("carbonaceous") natural resources (i.e., feedstocks) such as bituminous coal, lignite, biomass and various other waste materials (collectively "biomass"). For the gasification unit, in accordance with one preferred embodiment of the invention, the first step in the process is gasification of a carbonaceous source that is a mixture of lignite and wood pulp in a rotary kiln reactor. The products are hydrogen ($H_2$) and carbon monoxide (CO)— together known as SYG, the molecular building blocks for higher-order hydrocarbons. In the SETGAS Process, at least four product streams are possible from synthesis gas: 1) chemical fertilizers; 2) pipeline gas; 3) petrochemicals; and 4) SYG hydrogen fuel (from which CO is separated and conveyed to SETMOR metallurgical reactors 2.02.01 as oxygen sink in metallurgical ore reduction process. After purification of the gas 2.02.02, the SYG hydrogen ($H_2$) stream goes to gas turbine (HCC) units to generate electricity and steam.

SETZE Two-Step Gasification Process (SETGAS) for Bulk Hydrogen Production

SETGAS production commences with the preparation of coal-biomass feedstock (see FIG. 1.01) for input to a rotary kiln gasifier line 1.02.01. The raw lignite or bituminous coal is fed to a crusher 1.01.01, mixed with water 3.02.03 in a coal beneficiation machine 1.01.02, to improve the quality of the raw input matter as a feed stock, and stockpiled. Similarly, biomass, such as lumber waste, is passed through a biomass pulverizer 1.01.03 and mixed with water in a biomass beneficiation machine 1.01.04 and stockpiled. The coal stockpile and biomass stockpile are then passed, one at a time or simultaneously, to a feed blender 1.01.05 to obtain a desired size range and then to a pelletizer 1.01.06 to produce suitably sized feed pellets 1.01.07 that are stored until needed to feed the rotary kiln gasifier line 1.02.01.

With reference to FIG. 1.02, the composite coal-biomass pelletized feed stock 1.01.07, together with a supply of steam 3.02.06 and enriched air 3.01.06 (See FIG. 3.01 and discussion below) are input to rotary kiln gasifier 1.02.01. The output of the rotary kiln gasifier 1.02.01 is passed to crude gas condenser 1.02.02 that provides for gas cooling and separation, and into a gas cleaner 1.02.04, e.g., a Rectisol® brand gas cleaner, and a synthesis gas purifier 1.02.03. Gas cleaner 1.02.04 also further segregates the gasification process by-products 1.02.05 (e.g., tars, pitch, phenols, cresols and sulfur). The purified SYG stream 1.02.03 is then fed to the gas-gas cyclonic separator 1.04.01, for further processing.

Advantageously, the two-step gasification pathway illustrated in FIGS. 1.02 and 1.04 for generating bulk hydrogen excludes the water-gas shift reaction (WGSR) [$H_2O+CO \rightarrow CO_2+H_2$] feature that is common to conventional fluidized bed reactor (FBR) type gasification systems, for the purpose of boosting hydrogen output. Since SFTZE regulates (1.03.04) the proportions of the hydrogen and carbon monoxide inputs to the FBR (1.03.01), the need for WGSR is thereby obviated along this pathway.

In accordance with this preferred embodiment, bulk hydrogen 1.04.02 from the second step (FIG. 1.04) can be used to feed both a hydrogen-fired HCC power station 3.04.06 (FIG. 3.04) and an ammonia synthesis line 1.06.01 (See FIG. 1.06). Carbon monoxide 1.04.04 is thereby made available for use as an oxygen sink 2.02.01 in the SETMOR Bauxite Carbochlorination/MFBR Process (see FIG. 2.02), thus avoiding any potentially complex precombustion treatment of $CO_2$ emissions in the gasification subprocesses illustrated in FIGS. 1.02 and 1.04.

With reference to FIG. 1.03, because the FT-Reformer Feed Regulator 1.03.04 allows for an efficient ratio of hydrogen to carbon monoxide feed, the Fischer-Tropsch reformer line 1.03.01 does not require a WGSR step to maintain higher efficiency in the synthesis of methane for pipeline gas and higher-order hydrocarbons for petrochemical operations. To summarize, the SETGAS two-step for bulk hydrogen includes the following features:

After gasifier feed preparation as shown in FIG. 1.01 and discussed above, the first of two-steps involve the simplified production of SYG through a rotary kiln gasification as exhibited in FIG. 1.02. This method is more flexible and less-restrictive than the conventional FBR gasification alternatives; and The second step involves the SYG separation in the gas-gas cyclonic followed by purification, into bulk hydrogen ($H_2$) and carbon monoxide (CO) products. In a more preferred alternative embodiment, as shown in FIG. 1.04, the gas-gas cyclonic separator 1.04.01 of the second step takes the purified syngas 1.02.03 generated by the first step and separates it into hydrogen 1.04.02 and carbon monoxide 1.04.04 streams.

Of the hydrogen 1.04.02 produced in the second step, a first portion, preferably a large fraction (e.g., 50%) goes to the HCC power station 3.04.06 and to the Ammonia Synthesis line 1.06.01. A second portion and lesser fraction (e.g., 25%) goes to FT-FBR 1.03.01 for the production of methane/pipeline gas 1.03.02, and higher-order hydrocarbons ($C_2$-$C_{20}$) 1.03.03. The remainder of hydrogen 1.04.02 is distributed to the Plasma Gas Reduction (PGR) line to produce metallurgical powders 2.03.01 and to the Powder Injection Molding (PIM) furnace line 2.06.01.

Gasifier 1.02.01 FIG. 1.02, is preferably a rotary coal-biomass gasification kiln that includes step-1 in the gasifier subsystem specialized by SETZE to create a new reactor. The crude syngas output from the kiln 1.02.01 is condensed and cleaned-up in components 1.02.02 and 1.02.04 respectfully, providing separate process streams of purified syngas 1.02.03 and byproducts (tars, pitch, phenol, cresols, and sulfur) 1.02.05. The byproduct tars, pitch, phenol, cresols then can be refined and shipped as commercial products from component 1.02.05, while the sulfur, an important process intermediate, is passed on to component 1.05.01 (see FIG. 1.05) for the conventional production of sulfuric acid. The sulfuric acid serves as input to SETGAS fertilizer and petrochemical operations 1.06.05 and 1.06.07, and can also be sold as an industrial chemical, e.g., to regional consumers.

Referring to FIG. 1.04, a preferred gas-gas cyclonic separator 1.04.01 of syngas to $H_2$ and $CO^-$, step-2 in the gasifier subsystem, is shown. This separator conventionally acts on differences in the molecular weights of constituent gases in the heterogeneous stream, to enable separation under centrifugal force of Hydrogen ($H_2^{SYG}$) 1.04.03 and carbon monoxide ($CO^{SYG}$) 1.04.05.

Further, with reference to FIG. 3.04, bulk hydrogen 1.04.03 will be supplied to the zero-emission power plant 3.04.01, preferably an HCC power plant. It should be understood that any hydrogen-fired turbine technology can be used, and those systems available from or under development by leading energy and power systems engineering and development firms may be adapted by a person of ordinary skill in the art for use in the present invention.

Referring to FIG. 1.06, bulk hydrogen 1.04.03 (and a supply of nitrogen 3.01.03 received from an air separation plant 3.01.01) are input to a Haber ammonia synthesis plant 1.06.01 that produces ammonia $NH_3$ 1.06.02, which is stored in a bulk container, integrates the existing Haber process into SETZE.

The FT-Reformer Feed Regulator 1.03.04 furnishes an ideal mixture (critical ratio) of hydrogen and carbon monoxide to the FT fluidized HC Reformer to 1.03.01 (FIG. 1.03), based upon a SETZE variation of existing Fischer-Tropsch (FT) technology that's to be integrated in hydrocarbon reforming. Essentially, the FT process is the hydrogenation of carbon monoxide over a catalyst of either iron, cobalt or nickel with nominal reactor temperature of 250° C. and pressure of 10-60 barr. There results a heterogeneous mix of hydrocarbons that fall in two series:

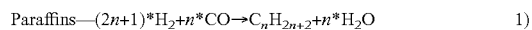

Paraffins—$(2n+1)*H_2 + n*CO \rightarrow C_nH_{2n+2} + n*H_2O$  1)

(for n=1, the first in this series is the reaction giving methane: $3*H_2 + CO \rightarrow CH_4 + H_2O$), and

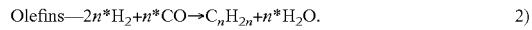

Olefins—$2n*H_2 + n*CO \rightarrow C_nH_{2n} + n*H_2O$.  2)

In the traditional FT process, the reaction is facilitated by the water gas shift reaction (WGSR):

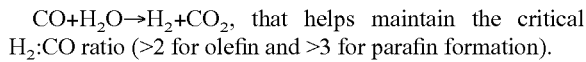

$CO + H_2O \rightarrow H_2 + CO_2$, that helps maintain the critical $H_2$:CO ratio (>2 for olefin and >3 for parafin formation).

SETGAS hydrocarbon reforming with a catalyst of iron, operates without WGSR. It differs from the traditional FT in that the critical ratio is maintained by the removal of excess CO (to be transferred to the SETMOR carbochlorination module) rather than through the production and supply of more $H_2$. Accordingly, the SETGAS method obviates the need for WGSR in hydrocarbon reforming.

Coal syngas is not the FT feedstock of choice because it is too high in CO; whereas natural gas, which is composed mostly of methane, is considered the ideal FT feedstock. The SETGAS process easily resolves this disadvantage for coal syngas with the economic diversion of unneeded CO to the SETMOR carbochlorination module. The remaining CO then satisfies the FT syngas criteria—the aforementioned critical ratio.

The higher-order hydrocarbons ($C_2$-$C_{20}$) output 1.03.01 then serves as intermediates to broader SETZE petrochemicals production 1.03.03.

Referring again to FIG. 1.03, the ideal feed mixture 1.03.04 is processed by one of a line of FT fluidized bed reformers 1.03.01, to furnish methane ($C_1$) to node 1.03.02 for the synthesis of pipeline gas. Here, the reformer 1.03.01 produces a separate stream of methane that is augmented in node 1.03.02 by pre-determined amounts of butane, ethane, pentanes, propane and nitrogen, to produce synthetic natural gas of nominal heating value when compared to the range of U.S. pipeline gas specifications.

Referring to FIGS. 1.04 and 2.02, CO 1.04.05 is provided to the SETZE carbochlorination reactor line 2.02.01 to function as an oxygen sink through the carbon oxides management as illustrated in FIG. 3.0.

The emerging clean coal (gasification) technologies that are being rapidly developed by the major nations and leading energy technology firms are only developing technology suitable for large-scale commercial operations, with no apparent efforts to program these technologies to specifically benefit domestic sub-economic communities, and underdeveloped nations. The elements of clean coal technology that are likely to work well in a rural setting, are related more to the low-tech rotary-kiln gasification reactor than to the complex fluidized bed systems. As the inventor has appreciated, the rotary kiln gasifier as employed in the present invention is thus economically and technologically competitive with the more costly, and challenging-to-operate fluidized bed gasifiers which, in contrast, require an oxygen feed, a high-pressure configuration, and an adherence to strict feed particle size and moisture specifications. Advantageously, the coal biomass gasification subprocess (FIG. 1.02) of the present invention configures an alternate, low-tech option—the rotary-kiln reactor—for gasification of a variety of consumable fuels (feedstock), coal, lignite or blended coal, lignite and biomass.

SETZE Carbon Oxides Management (SETCOM)

The SETCOM carbon oxides management subprocess (see FIG. 3.0) eliminates a major impediment to zero-emission hydrogen-fired HCC power generation (see FIG. 3.04), through the efficient disposal of byproduct carbon oxides. This is achieved through the appreciation by the inventor of an elegant extension of the realm of process integration beyond that of energy-sector modules to include economic industrial processes that are physically located nearby the source of the carbon oxide byproducts, and that routinely consume carbon oxides on a volume basis that matches the energy-sector production of carbon-oxides, as noted above with reference to FIG. 1.0.

The present invention also covers the alternative operational situation where the resource mix excludes metallurgical ores to assist in the disposal of carbon oxides. By way of example, if carbon monoxide 1.04.05 cannot feasibly be piped to SETMOR's CCK line 2.02.01 through SETCOM, it can be converted on a bulk basis to carbon dioxide ($2*CO + O_2^{WS} \rightarrow 2*CO_2$) and then routinely processed by the SETCOM subsystem to manufacture economic carbon-based intermediates such as carbon fiber and carbon fiber composites like CFRP.

Referring to FIG. 3.O, SETCOM is shown diagramatically, illustrating the integration of the SETZE System and the production, management and processing of the carbon oxides. Air separation unit 3.0.301 produces $O_2$, $N_2$ and enriched air. Gasification reactor 3.0.102 receives the coal biomass pellet feedstock, steam and $O_2$ and generates $H_2$, CO, SynGas and pipeline gas. An ammonia synthesis reactor 1.06.01 receives the $N_2$ and the $H_2$ and produces $NH_3$. The metal ore reduction component 3.02.202 receives CO and byproducts from gasification reactor 3.0.102 and produces $CO_2$ and metchlors 2.02.04. Methane synthesizer 3.05.02 consumes $CO_2$ and $H_2$Ws and produces $CH_4$ 3.05.04. Methane 3.05.04 can be combined with gas output from gasification reactor 3.0.102 in the FT synthesis facility 1.03.01 to produce commercial pipeline gas.

Urea synthesizer 3.05.03 receives $CO_2$ and $NH_3$ and outputs urea 3.05.05 to be consumed by facility 1.03.03 to make intermediates for plastics and resin, and facility 1.06.10 to make intermediates for fertilizers and feed products, for market 3.0.300.

The $CO_2$ produced can be processed in carbon recovery reactor 3.05.01 to produce elemental carbon. The high purity metal powder alloys component 3.0.203 receives metchlors 2.02.04, $H_2^{SYG}$ 1.04.02, and power 3.04.03 and produces elemental metals 2.03.05, which can be processed by Powder Injection Molding ("PIM") 3.0.206 with furnace atmospheres of $H_2$, $N_2$ and other rare gas inputs (e.g., Ar) to produce end products for market 3.0.300, or to a wrought alloy production facility 2.07.01 or to carbides, cermats and metal composite production facility 3.0.204, along with elemental carbon, to make end products for market 3.0.300. Elemental carbon can be consumed by facility 3.05.06 to produce finished products for market 3.0.300, or by petrochemical production facility 3.0.307 which, together with methane 3.05.04 and SynGas from reactor 3.0.102, in facility 1.03.01 in turn produces higher order hydrocarbons $C_2$-$C_{20}$ products 1.03.05 for market 3.0.300. See FIG. 1.06.

Also, ammonia production facility 1.06.01 can produce materials that when combined with sulfuric acid, phosphoric acid or nitric acid, and other necessary raw materials to make by known processes fertilizers suitable for market 3.0.300. See FIG. 1.06.

Advantageously, the SETCOM subprocess 3.05, illustrated in FIG. 3.05, supersedes the costly, questionable remedies involving $CO_2$ sequestration, that have been variously used and/or contemplated by major gasification operators and project planners. Principal among the volume applications for disposal of $CO_2$ 1.03.01 and 2.02.03 is its economic reduction to elemental carbon 3.05.01, followed by the production of carbon fibers 3.05.06 from the elemental carbon for use in reinforced precast concrete modules and carbides, cermats, and metal composites 3.05.07, and the like. Embodiments of the reduction of $CO_2$ to elemental carbon is as follows.

i) Carbon/Chlorine integrated recovery/heat exchanger system 3.05.01

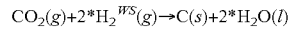

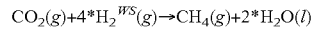

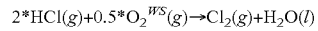

ii) Water splitting (WS) system 3.03.01 illustrated in FIG. 3.03 which utilizes water from reservoir 3.02.03 (FIG. 3.02) and power from photovoltaic devices 3.03.04, for conventional production of secondary hydrogen $H_2$Ws 3.03.03 and oxygen $O_2^{WS}$ 3.03.02, stored in unresponding storage units for subsequent use.

Several versions of this technology have been implemented and may be used and others are still under development in both the public and private sector. Any technology may be used. One suitable technology will employ a III-V photovoltaic (PV) device. A quaternary III-V alloy layer of indium gallium arsenide nitride (InGaAsN), folded in a multilayer PV cell, has been demonstrated by scientists at Sandia National Labs to generate electricity with efficiency up to 40%; by comparison, single-cycle gas turbine power generation enjoys only 35% efficiency, while silicon and GaAs PVs, have nominal efficiencies of only 12.3% and 21.6%, respectively. Low-cost, high-purity SETMOR gallium and indium metal will provide an incentive to semiconductor device developers to produce the new high-efficiency InGaAsN PV cell for water-splitting (WS). This PV cell will in turn be applied for bulk WS hydrogen and WS oxygen production. SETCOM will use the intermediate WS hydrogen in the recovery of elemental carbon from $CO_2$.

iii) $CO_2$ to methane synthesis 3.05.02 to pipeline gas 1.03.02 and petrochemicals 1.03.01. The application of the second reaction under (i), a Lurgi gasification reaction, is applied here and then integrated into SETCOM.

iv) $CO_2$ to urea synthesis 3.05.03 then to petrochemicals' intermediates 1.03.03 input for plastics and resin products and 1.06.10 urea input for fertilizer and livestock feed production.

v) $CO_2$ to elemental carbon then to carbon-fiber, carbon-fiber reinforced plastic (CFRP) and other composites. The first reaction under (i) produces elemental carbon from the hydrogenation of $CO_2$ with the lower-cost hydrogen (WS). In the SETCOM method for producing carbon fibers (CF), the elemental carbon from 3.05.01 will be used in thermally-assisted impregnation 3.05.06 of precursor rayon—a polymer with only 44.5% wt. initial carbon content, to achieve a greater nominal carbon content greater than about 82%, preferably from 82 to 88% (polyacrylonitrile (PAN)— a precursor with 85% wt. initial carbon, is traditionally preferred but costly). From the enhanced rayon precursor, intermediate carbon filament is made by oxidation and thermal pyrolysis. As with all polymers, the precursor molecules are long chains, that are aligned in the process of drawing fibers. These fibers bond side-to-side when heated, forming narrow sheets that eventually merge to form a single, jelly roll-shaped material with 92-96% by weight carbon content. The carbon fibers are further enhanced as high modulus or high strength material through additional heat treatment steps. Regarding the economics of CF applications, while PAN-based CF is seen as ideal for aircraft materials, high-end passenger vehicles and other high-tech applications, it's too costly for other potentially major applications such as CF-reinforced precast structural panels that are poised to drive far reaching changes in building design and construction. The potentially lower-cost process path afforded by SETZE rayon CF, may reduce product cost to a range that makes CF an economic surrogate for steel rebar and welded-mesh in the current precast structural materials sector.

Numerous process components across the three SETZE operational areas of: 1) gasification and petrochemicals (SETGAS); 2) metallurgy and ceramics; and, 3) carbon oxides management and SETZE process support, require air separation subsystem inputs (see FIG. 3.01), processed water 3.02.03 and generated steam (see FIG. 3.02), and secondary hydrogen and oxygen (see FIG. 3.03).

The SETZE air separation subsystem (FIG. 3.01) provide both high-purity oxygen 3.01.02 and enriched process air 3.01.06 as input to the gasifier line 1.02.01 of SETGAS. A conventional air separation plant 3.0.01 is provided that receives as an input water 3.02.03, power from HCC power plant 3.04.03, and air. Air separation plant 3.01.04 conventionally separates air into oxygen 3.01.02, nitrogen 3.01.03, and rare gases 3.01.04, stored in respective containers under compression. Nitrogen 3.01-0.03 is to be largely consumed by the chemical fertilizer synthesis subprocess (FIG. 1.06) as a direct teed to the Haber process 1.06.01 for synthesis of ammonia 1.06.02, and indirectly to the synthesizer 1.06.03 for synthesis of nitric acid 1.06.04, which in turn feeds synthesizer 1.06.11 for the synthesis of ammonium nitrate 1.06.12. The rare gases (e.g., argon, neon, krypton and xenon) 3.01.04 are used variously to condition sintering furnace atmospheres in furnace 2.06.03 for the metallurgical PIM subprocesses (FIG. 2.06), furnace 2.07.04 in powder-fed rolling mills (FIG. 2.07), and furnace 2.08.06 in powder-fed billeting/extrusion operations (FIG. 2.08), or alternatively refined and sold as end products. Also, to reduce some of the cost, some of the ambient air input is passed through a filter 3.01.05 and mixed with pure oxygen (e.g., a 50/50 mix) 3.01.02 to produce enriched air 3.01.06, which, as noted, can be passed to the air input of gasifier line 1.02.01.

Referring to FIG. 3.02, a water/steam processing subsystem is illustrated in which raw sea water, e.g. from a sea source, and optionally process water that is being recycled and/or fresh water from a source such as a river or lake, are input into corresponding settling ponds 3.02.01 and 3.02.03. Recycled water 3.01.02 comes from, for example, methane synthesis 3.05.02 and carbon recovery reactor 3.05.01, as well as other sources. The settling pond1 3.02.01 water is then passed through the desalinization plant 3.02.02 and settling pond2 3.02.03 water is then passed through 3.02.04, The fresh water from the desalinization plant and the purified recycled water is then stored in process water reservoir 3.02.05. Reservoir 3.02.05 can then be used as a water supply for steam generation plants 3.02.06 (FIG. 2.02), plant process water for various needs, and potable water 3.02.07 that may be sold to a local market 3.0.300.

Referring to FIG. 3.04, a representative hydrogen/steam combined cycle ("HCC") electrical power plant is illustrated. In this representative design, and it should be understood that any commercial design may be used, $O_2^{AS}$ 3.01.02 is fed to compressor 3.04.05 and compressed $O_2^{AS}$ 3.01.02 is mixed with $H_2^{SYG}$ 1.04.02 in a combustion chamber 3.04.06 which is used to drive hydrogen turbine/generator 3.04.01. Movement of turbine 1.04.01 turns generator 3.04.07 that in turn generates power—e.g., electricity 3.04.04. The heat exhaust from turbine 1.04.01 is fed to heat recovery steam generator (HRSG) 3.04.02 where purified water 3.02.03 or 3.02.05 is converted to superheated steam that drives steam turbine generator 3.04.03 that drives generator 3.04.08 to produce electricity 3.04.04. The steam exiting the steam turbine 3.04.03 is fed to steam generation plant 3.02.06 and to potable water plant 3.02.07, where pure water is recovered for use.

Referring to FIG. 1.05, a sulfur intermediates production subprocess is illustrated. This facility receives hydrogen sulfide $H_2S$ 1.02.05, a gas byproduct of the gasification process, and recycles sulfur dioxide $SO_2$ 1.06.08 in a Claus process plant 1.05.01, which employs in a conventional manner a catalytic process for producing elemental sulfur. Claus process plant 1.05.01 also produces water as a byproduct which is sent to process water recycling facility 3.02.02.

The elemental sulfur is then processed through a conventional contact oxidation process to produce sulfuric acid $H_2SO_4$ 1.05.05. First, elemental sulfur is passed into a contact process reactor 1.05.02 where it is oxidized with $O_2^{AS}$ 3.01.02 to produce sulfur dioxide 1.05.08. The sulfur dioxide 1.05.08 is split with a portion being fed back to Claus process plant 1.05.01 to be recycled as noted, and the remainder sent to a second contact process reactor where the $SO_2$ 1.05.08 is oxidized with $O_2^{AS}$ 3.01.02 in the presence of a catalyst, e.g., $V_2O_5$, preferably produced by the SETMOR ceramic processing facility 2.04.05, to produce $SO_3$. The $SO_3$ is then combined with $H_2O$ 3.02.03 in sulfuric acid plant 1.05.04 to produce sulfuric acid $H_2SO_4$ where it is stored in bulk in tank 1.05.05. The sulfuric acid from tank 1.05.05 can then be supplied to fertilizer production synthesizer 1.06.05, petrochemical production 3.06.08 or for refinement and sale as commercial products.

Further with respect to FIG. 1.06, a phosphoric acid synthesizer 1.06.05 is provided that receives sulfuric acid 1.05.05 and calcium phosphate ore $Ca_3(PO_4)_2$ and produces in a conventional manner phosphoric acid 1.06.06, and also byproduct $CaSO_4$ that can be sold as gypsum. The phosphoric acid 1.06.06 can then be added to ammonia 1.06.02, in an ammonium phosphate synthesizer 1.06.13, to produce ammonium phosphate $NH_4H_2PO_4$ 1.06.14 that can be used as an intermediate in the production of phosphatic fertilizers. Also illustrated is that the ammonia 1.06.02 and carbon dioxide can be combined in a urea synthesizer 1.06.09 to produce urea ($NH_2CONH_2$) 1.06.10 and water (to be recycled at facility 3.02.02). The urea byproduct can be fed for consumption in manufacturing petrochemicals, fertilizers and livestock feed. Further, the sulfuric acid 1.05.05 can be combined with ammonia 1.06.02 in an ammonium sulfate synthesizer 1.06.07 to produce ammonium sulfate $(NH_4)_2SO_4$ 1.06.08, that can be used in the manufacture of sulfate fertilizers.

Referring to FIG. 3.06, a chlorine and HCl recovery process is shown. Chlorine from a commercial source and recovered chlorine 2.04.02 from plasma oxide synthesis POS reactors are respectfully passed through appropriate filters 3.06.01 and 3.06.02 and stored in process chlorine tank 3.06.05. Process chlorine 3.06.05 is thus available to the carbochlorination reactor 2.03.01 for laterite/bauxite conversion. Similarly, recovered hydrochloric acid (HCl), e.g., from plasma gas reduction PGR reactors 2.03.02 is passed through a suitable filter 3.06.03. Filtered HCl is then passed, together with $O_2^{WS}$ 3.03.02 into chlorine recovering reactor 3.06.04, where it is reduced to chlorine, stored in chlorine tank 3.06.05, and $H_2O$ 3.02.02, which is then recycled. In addition, filtered HCl is passed to process hydrochloric acid 3.06.06 from which it is delivered for use in inorganic processes 3.06.07, petrochemical operations 3.06.08, and for commercial supply 3.06.09.

SETZE Metallurgical—Zero-Emission Production of Aluminum and Other Metals from Bauxite/Laterite The SETZE metallurgical ore reduction (SETMOR) subprocess is an innovative procedure that breaks new ground by integrating bauxite carbochlorination (see FIG. 2.02) with plasma gas reduction (see FIG. 2.03) to yield high-purity metallurgical powders. Depending on reactor settings and atmospheres, these metal powders can precipitate as either nanoscale powders or dendritically-shaped particles, with the latter form in particular facilitating a range of mechanically alloyed, rolled and extruded finished products. SETMOR's advanced fabrication of high-purity, dendritically-shaped metal powder, resolves the problem encountered by du Pont in achieving direct powder conversion of dendritically-shaped interlocking particles into wrought metals. The mechanically blended alloys of the metallurgical powders produced by the metallurgical subprocess illustrated in FIGS. 2.02 and 2.03 of the present invention offer improved uniformity and mechanical performance in PIM and other wrought products. By employing more efficient ore processing than the century-old traditional Bayer/Hall-Heroult (BHH) method used by the major aluminum producers, SETMOR's concurrent multiprocessing of numerous metal oxides fully utilizes all economic metals and ceramics that are present in the bauxite/laterite matrix. Whereas the traditional BHH monoprocessing of alumina/aluminum or iron necessarily excludes lateritic ores as a resource, the ability to achieve concurrent extraction of aluminum, titanium and other economic metals under the SETMOR subprocess (FIG. 2.02), in accordance with the present invention, reduces the cost-burden on each of these primary metals by distributing mining and processing costs over both aluminum and titanium, as well as silicon, iron, and the valuable trace metals also found in bauxite/laterite deposits.

With reference to FIG. 2.02 SETMOR production, metallurgical ore reduction process can use any of a variety of mineral resources that are preprocessed as feed in a carbochlorination kiln feed preparation as illustrated in FIG. 2.01. In addition, metallurgical ores containing metal oxides including bauxite and laterite (lower grade aluminum ore with representative by-weight composition of: 38% total $Al_2O_3$ and 33% $Fe_2O_3$; 2.8% $TiO_2$; 2.7% $SiO_2$; traces and water) can be used, and may often be found in locales where higher-grade bauxite (representative, by-weight mineral profile: 55% total $Al_2O_3$; 3.5% $Fe_2O_3$; 2.8% $TiO_2$; 6% $SiO_2$; traces and water) may be depleted. Significantly, laterite reserves (*Bauxite and Aluminous Laterite*, by Cyril Sankey Fox, 1932, Lockwood & Son), have often been ignored as undervalued mineral assets—for metallurgical purposes, because there was no known, viable process by which to extract key metals. In some bauxite-bearing areas where there are contiguous iron ore deposits, laterite occurs as an alteration product in the intermediate zone.

Consequently, rather massive ore bodies with relatively lower grades of alumina, such as aluminous laterites (which may be concurrently processed for titanium under SETMOR) may become economically viable proven reserves in the context of the present invention.

Turning to FIG. 2.01, a process for preparation of a carbochlorination kiln feedstock is shown. In this process, the primary feedstock is derived from laterite 2.01.01 which is passed through an ore crusher 2.01.03 and mixed with $H_2O$ 3.02.03 or 3.02.05 in a laterite beneficiation facility 2.01.05 to form a laterite stockpile 2.01.10. Similarly, a secondary supply such as bauxite 2.01.02 is provided, crushed in an ore crusher 2.01.04 and, with $H_2O$ 3.02.03, mixed in bauxite beneficiation facility 2.01.06 and sent to a bauxite stockpile 2.01.11. The stockpile laterite and bauxite (and other sources) are passed to feed blender 2.01.07 and to a pelletizer 2.01.08 to produce a relatively uniform 50-50 blended mixture of feed pellets that are stored in container 2.01.09.

With respect to FIG. 2.02, a carbochlorination and metchlor refining subprocess is illustrated. A rotary kiln reactor 2.02.01 is provided which has as inputs the feedstock 2.01.09, chlorine 3.06.05 and carbon monoxide 1.04.03. The kiln output is continuously streamed to a novel and economically essential manifold fluidized bed reactor (MFBR) 2.02.02 that performs the function of segregating gaseous metchlors and byproduct $CO_2$ 2.02.03 by weight, then passing raw homogeneous gases into individual chambers for respectively cleaning and purifying the metchlors 2.02.04 corresponding to the plurality of metallic components of the ore that are desirable to extract, and waste 2.02.05 for recycling. The $CO_2$ 2.02.03 is in turn passed to methane gas production 1.03.02, carbon recovery reactor 3.05.01, 3.05.02, and 3.05.03, and the metchlors 2.02.04 are passed to PGR 2.03.01, POS 2.04.01, and a facility 2.02.06 for refining metchlors into commercial end products for sale.

A green process, SETMOR works in tandem with a coal/biomass gasification line which, in turn, fuels the gas-turbine module of a HCC power generation system. As noted, in the gasification subprocess illustrated and discussed above with respect to FIGS. 1.02 and 1.04, carbon monoxide (CO) is stripped away and piped to the carbochlorination component of the physically adjacent SETMOR carbochlorination subprocess. There, CO serves as an oxygen sink in a bauxite carbochlorination process. This crucial step leaves behind pure hydrogen fuel suitable for HCC zero-emissions power generation, while consuming the CO so produced, in carbochlorination; advantageously, this CO by-product is a substitute for coke—the traditional oxygen sink in carbochlorination.

The SETMOR subprocess of the present invention illustrated in FIG. 2.02 also eliminates the release of greenhouse gases generated by the conventional BHH smelting by recycling off-gases such as carbon dioxide and halocarbons, in physically-sealed processes. For aluminum production, comparative analysis of energies of formation for the traditional BHH process and the SETMOR subprocess shown in FIGS. 2.02 and 2.03, indicates far greater energy efficiency for the SETMOR subprocess, as detailed below.

In addition, in accordance with the present invention, exotic trace metals found in bauxite/laterite ores are also recoverable for use, for example, in ultrahigh-performance electronics and solar cells. In this regard, the bulk of bauxite is made-up of oxides of aluminum, iron, silicon and titanium. For many bauxite/laterite deposits, additional high-value trace metals are also present: gallium, zirconium, vanadium, scandium, chromium and indium. Moreover, it is recognized that bauxite/laterite is the primary source of gallium, an element used in ultrahigh-performance electronics and photovoltaics (PV).

In this regard, the dramatic development of electronics over the last fifty years, has been driven almost exclusively by continuing advances in silicon-based semiconductor technology. And while silicon will continue to be the primary semiconductor material on a volume basis, increasingly, the stringent performance requirements of new and important device applications press beyond the physical limits of silicon, demanding materials of exceptional performance. Dominant among such new materials is the family of semiconductor compound materials formed from elements of Groups III and V of the Periodic Table of Elements. Collectively known as the "III-V" Compounds Group, these materials—such as gallium arsenide, gallium nitride (e.g., the base compound of Blu-ray disc technology), and quaternary alloys like indium gallium arsenide nitride (InGaAsN)—have been employed in the fabrication of devices demonstrating superior semiconductor performance over silicon. Gallium arsenide, for example, is a material of choice over silicon for microwave and optoelectronic (used in effective night-vision systems) applications.

A quaternary III-V layer, folded into a multilayer photovoltaic (PV) cell, can generate electricity with efficiency as high as 40%; compared to 35% efficiency for single-cycle gas turbine power generation. Silicon and GaAs PVs, have practical efficiencies of only 12.3% and 21.6%, respectively. Due to high prices, gallium and indium based III-V PV products, currently are only used in the highest performance applications, such as space-related and military weapons systems. The SETMOR metal refining subprocesses (FIGS. 2.02-2.03) advantageously allows one to capture gallium, and other trace metals in the bauxite matrix, as nanoscale metallic powders. SETCOM will preferably use the new III-V PV cell, which can generate electricity with up to 40% efficiency, thus producing cheaper hydrogen through water splitting at a higher output rate, to make WS-hydrogen to be used in the recovery of elemental carbon from $CO_2$.

Enthalpies For Bayer/Hall-Heroult and Setze Processes

The following provides a comparative theoretical analysis of the net energies of formation in the production of aluminum between the traditional Bayer/Hall-Heroult (BHH) technology and the present invention. BHH steps 1 through 4 with net energy change of 569.5 kilojoules per mole of aluminum, and the present invention steps 1 through 3 with net energy change of 114.3 kilojoules per mole of aluminum, are directly comparable. This leads to the ratio: 114.3/569.5=0.2 or 20% which in turn suggests the present invention will produce aluminum at only ⅕ the energy of BHH.

DEFINITIONS (s)—solid ◇—crystal form (l)—liquid (g)—gas

Al(OH)—aluminate ion

OH⁻—hydroxyl ion (aq)—aqueous solution

◇H—standard enthalpy change due to reaction

Bayer/Hall-Heroult (BHH) Process

1. Digestion of Bauxite $$Al_2O_3 \cdot 3H_2O \text{ (gibbsite)} + 2OH^-(aq) \rightarrow 2Al(OH)(aq)$$

◇H=+20.9 kJ/mol Al

2. Precipitation $$2Al(OH)(aq) \rightarrow Al_2O_3 \cdot 3H_2O\text{(gibbsite)} + 2OH^-(aq)$$

◇H=−20.9 kJ/mol Al

3. Calcination of Hydrate Giving Alumina $$Al_2O_3 \cdot 3H_2O\text{(gibbsite)}) \rightarrow Al_2O_3(s, \diamond) + 3H_2O \text{ (l)}$$

◇H=+26.8 kJ/mol Al

4. Electrolysis of Alumina Giving Aluminum Metal $$Al_2O_3(s, \diamond) + 1.5C(s) \rightarrow 2Al(s) + 1.5 CO_2(g)$$

◇H=+542.7 kJ/mol Al

Total: BHH Process' net standard enthalpy change=+569.5 kJ/mol Al.

Setze Reduction Process

1. Chlorination

◇H=−105.2 kJ/mol Al

2. SETZE Chloride Reduction

◇H=+371.0 kJ/mol Al

3. Chlorine Recovery

◇H=−151.5 kJ/mol Al

Subtotal (BHH-comparable): SETZE Process' net standard enthalpy change=+114.3 kJ/mol Al.

4. Carbon Recovery

◇H=+133.6 kJ/mol Al

5. Ceramic Synthesis

◇H=−190.0 kJ/mol Al

Total: SETZE Process' net standard enthalpy change=+57.9 kJ/mol Al.

By piping CO production from the gasification subprocess (FIG. 1.04) to the metallurgical subprocess (FIG. 2.02), located nearby, reduction of metallurgical ore is rendered more economical and environmentally sound. The traditional reduction of alumina ($Al_2O_3$) produces about seven tons of $CO_2$ for every ton of virgin aluminum produced. However, under the combined action of the Carbon/$CO_2$ Recovery subprocess 3.05 and the SETMOR metallurgical reduction subprocess 2.02, $CO_2$ is captured and disposed of by SETCOM, thus allowing the production of $CO_2$-free aluminum, titanium and other metals found in the bauxite matrix.

In accordance with a preferred embodiment:

i) Rotary kiln carbochlorination of metal oxides with CO as reactant (discussed above with respect to FIG. 2.02) rather than coke.

Versions of rotary kiln chlorination and other metallic ore reduction methods have been under development by Outokumpu Research of Finland, Tata Steel of India, and U.S. Pat. No. 5,314,171, issued May, 1994. Outokumpu Research has disclosed technology for, and released a (May 2004) paper on "HydroCopper"—a new technology said to produce copper directly from concentrate. HydroCopper' is "comprised of a chloride-leaching method for copper sulphide concentrates and the copper production." Here, the chlorination (not carbochlorination) of copper-bearing ore is involved. Tata Steel has implemented rotary kiln reactors (probably with an indirect heating system) in the direct reduction of iron ore with coke as a reactant (serving as an oxygen sink). U.S. Pat. No. 5,314,171 entitled "Apparatus for the extraction of metals from metal-containing raw materials," addresses high-temperature rotary kiln chlorination of metal-bearing ores, through an indirectly-heated kiln reactor with a refractory ceramic shell housing. Apparently, U.S. Pat. No. 5,314,171 claims that high-purity metal is a product of the rotary kiln, itself.

The SETMOR system differs from these and other rotary kiln and/or ore chlorination reduction systems on several points: 1) because many metal-bearing minerals cluster (e.g. copper, silver and gold, or titanium and zirconium), the SETMOR carbochlorination kiln/MFBR concurrently reduce the economic metals in each mineral cluster; 2) because the farther processing of metchlors is necessarily along several process paths, the immediate reduction, as in the case of U.S. Pat. No. 5,314,171, of all available metchlors solely as metals would preclude the sale of metchlors as finished products (e.g., titanium tetrachloride or ferric chloride) or metchlors as feedstock for SETMOR/POS ceramics' reforming (e.g. chromium oxide or titanium oxide pigment). The SETMOR method is thought to be unique given the foregoing points.

The following carbochlorination reactions act on a representative ten metal oxides in bauxite/laterite that are of interest to SETMOR in kiln 2.02.01, production of a gaseous, heterogeneous mix of metchlors 2.02.02 and $CO_2$ 2.02.03. This mixed gas is conveyed to the SETMOR/MFBR 2.02.02 which yields separated and purified homogeneous metchlors streams 2.02.04.

$$Al_2O_3+3*Cl_2+3*CO \rightarrow 2*AlCl_3+3*CO_2$$

$$Cr_2O_3+3*Cl_2+3*CO \rightarrow 2*CrCl_3+3*CO_2$$

$$Fe_2O_3+3Cl_2+3*CO \rightarrow 2*FeCl_3+3*CO_2$$

$$Ga_2O_3+3*Cl_2+3*CO \rightarrow 2*GaCl_3+3*CO_2$$

$$In_2O_3+3*Cl_2+3*CO \rightarrow 2*InCl_3+3*CO_2$$

$$Sc_2O_3+3*Cl_2+3*CO \rightarrow 2*ScCl_3+3*CO_2$$

$$SiO_2+2*Cl_2+2*CO \rightarrow SiCl_4+2*CO_2$$

$$TiO_2+2*Cl_2+2*CO \rightarrow TiCl_4+2*CO_2$$

$$V_2O_5+4*Cl_2+5*CO \rightarrow 2*VCl_4+5*CO_2$$

$$ZrO_2+2*Cl_2+2*CO \rightarrow ZrCl_4+2*CO_2$$

ii) Capture of $CO_2$ 2.02.03 from carbochlorination as input to SETCOM's integrated recovery/heat exchanger subsystem (bullet i, page 30).

iii) The SETMOR MFBR 2.02.02 separates and purifies the metchlors for input to Plasma Gas Reduction (PGR) reactor 2.03.01 or Plasma Oxides Synthesis (POS) reactor 2.04.01.

iv) Referring to FIG. 2.03, SETZE Plasma Gas Reduction 2.03.01 of metchlors 2.02.04, to nanoscale-range or dendritically-shaped metal powders utilizes a plasma gas reduction (PGR) reactor 2.03.01 that receives metchlors 2.02.04, power 3.04.03, preferably from HCC powerplant, and $H_2^{SYG}$ 1.04.02. Reactor 2.03.01 produces HCl 2.03.02 and metal powders that are degassed and cooled in facility 2.03.03 and refined in metal powders refinery 2.03.04 to produce elemental metal powders that are stored in segregated silos 2.03.05. The HCl gas is sent to the chlorine recovery 3.06.03. It should be understood that reactor 2.03.01, degassing and cooling facility 2.03.03 and refinery 2.03.04 actually represent a plurality of lines of reactors, facilities and refineries, each of which is dedicated to the reduction of a specific metchlor, such that the specific metchlor is cooled, degassed, and refined, and then stored separately. Only a single reactor and subsequent processing facilities are shown to simplify the discussion. A suitable technique may be employed based broadly on known technology advanced by the U.S. Naval Research Labs and Idaho National Engineering Labs (INEL), which sought a cheaper method for producing titanium metal that was more direct (less complex) and less expensive than the traditional Kroll process: $(TiO_2+2*Cl_2+C \rightarrow TiCl_4+CO_2/2*Mg+TiCl_4 \rightarrow 2*MgCl_2+Ti)$. The Kroll process uses coke (rather than CO) as an oxygen sink in the first reaction, and expensive magnesium is consumed in the second reaction. It also requires two days to process a batch yielding only a few tons high-purity titanium per process path/reactor.

The SETZE Plasma Gas Reduction reactions are:

$$AlCl_3+1.5*H_2 \rightarrow Al+3*HCl$$

$$CrCl_3+1.5*H_2 \rightarrow Cr+3*HCl$$

$$FeCl_3+1.5*H_2 \rightarrow Fe+3*HCl$$

$$GaCl_3 1.5*H_2 \rightarrow Ga+3*HCl$$

$$InCl_3+1.5*H_2 \rightarrow In+3*HCl$$

$$ScCl_3+1.5*H_2 \rightarrow Sc+3*HCl$$

$$SiCl_4+2*H_2 \rightarrow Si+4*HCl$$

$$TiCl_4+2*H_2 \rightarrow Ti+4*HCl$$

$$VCl_4+2*H_2 \rightarrow V+4*HCl$$

$$ZrCl_4+2*H_2 \rightarrow Zr+4*HCl$$

v) SETZE Plasma Oxides Synthesis (POS), see FIG. 2.04, for oxide ceramics production utilizes a POS reactor 2.04.01 that receives metchlors 2.02.04, SynGas fuel 1.03.02 and $O_2^{As}$ 3.01.02 and produces chlorine gas 2.04.04 that is in turn passed to chlorine recovery 3.06.02. It also produces oxide metal powders that are provided to facility 2.04.03 for cooling and degassing, and then to refining 2.04.04 to produce ceramic powders that are stored in segregated silos 2.04.05. Again, it should be understood that reactor 2.04.01 and facilities 2.04.03 and 2.04.04 are actually a plurality of reactors such that one set is dedicated to the reduction of a specific metchlor in producing a particular ceramic powder product. (A suitable procedure may be employed based broadly on DuPont Chemicals prior art in high-quality pigment production). The conversion of selected metal oxides to metchlors and back again to metal oxide ceramics yields a more perfectly formed crystalline structure for the following identified seven POS ceramic products.

$$Al_2Cl_6+1.5*O_2 \rightarrow Al_2O_3+3*Cl_2$$

$$2*CrCl_3+1.5*O_2 \rightarrow Cr_2O_3+3*Cl_2$$

$$2*FeCl_3+1.5*O_2 \rightarrow Fe_2O_3+3Cl_2$$

$$SiCl_4O_2 \rightarrow SiO_2+2*Cl_2$$

$$TiCl_4+O_2 \rightarrow TiO_2+2*Cl_2$$

$$2*VCl_4+2.5*O_2 \rightarrow V_2O_5+4*Cl_2$$

$$2*ZrCl_4+1.5*O_2 \rightarrow Zr_2O_3+4*Cl_2$$

vi) SETZE Carbide Synthesis 3.05.07 for carbon ceramics production with powder solid-solid processing under SETMOR. Referring to FIG. 2.05, a process for processing the metallic powders 2.03.05 and ceramics 2.04.05 is illustrated. Various powders 2.03.05 can be selected and blended in blender 2.05.01 to produce alloy powders

2.05.02 that can be transferred to a powder feed blender line 2.05.04 and optionally mixed with ceramics from ceramic storage 2.04.05 and binder components 2.05.03 and as blended delivered for storage and/or subsequent processing by PIM line 2.06.01, rolling mill 2.07.01 or billet extrusion line 2.08.01. Or of course, the blended material could be refined and sold as a commercial product. A suitable procedure may be employed based broadly upon prior art of Randall Germann, a U.S. academic researcher in powder metallurgy.

vii) Powder Injection Molding (PIM)/sintering process (See FIG. 2.06) is used to make finished products. Referring to FIG. 2.06, a powder injection molding (PIM) process is shown. A powder feed 2.05.04, which may be a blended mixture of matter such as metals, ceramics and binders, or combinations or subcombinations thereof, and the blended mixture passed into an extruder 2.06.01. The binder is a petrochemical compound used to bind the powders in the desired form for processing. The extrudate is then passed to a debinder furnace 2.06.02, which preferably is fired by SynGas 1.03.02, in an inert furnace gas atmosphere 3.01.03, under conditions that eliminates the binder from the extrudate. The extrudate is then fed to a sintering furnace 2.06.03, which is also fired by SynGas 1.03.02 and has an inert furnace gas atmosphere 3.01.04. The sintered extrudate is then finished at station 2.06.04 and placed in inventory 2.06.05 for subsequent sale, use or distribution.

viii) Rolling and extrusion to finished powder alloy rolled products 2.07.01-02. Referring to FIG. 2.07, a powder rolling mill production process is shown. A powder feed 2.05.04, which may be a blended mixture of matter such as metals, ceramics and binders, or combinations or subcombinations thereof, is fed into a powder compactor and rolling mill sheeting facility 2.07.02 that will produce rolled sheet. The rolled sheet is passed to a debinder furnace 2.07.03, which preferably is fired by SynGas 1.03.02, and an inert furnace gas 3.01.03, and eliminates the binder from the sheet. The rolled metal sheet is then fed to a heat treat furnace 2.07.04, which also burns SynGas 1.03.02 and has an inert furnace gas atmosphere gas 3.01.04. After heat treatment, the sheet may be subjected to converted coil cold rolling and finishing processes in a suitable mill 2.07.05. The finished sheet, preferably in a coil, is placed in inventory 2.07.06 for subsequent sale, use or distribution.

ix) Referring to FIG. 2.08, a powder billet extrusion production process is shown. A powder feed 2.05.04, which may be a blended mixture of matter such as metals, ceramics and binders, or combinations or subcombinations thereof, is fed into a powder compactor 2.08.01 to form billets that are put in storage until needed. The billets, when needed, are passed to a billet reheat furnace 2.08.03, which preferably consumes SynGas 1.03.02, and an inert furnace gas 3.01.03, and when at the desired temperature are delivered to a hot extrusion process 2.08.04. The extrudate is then passed through a debinder furnace 2.08.05 and a sintering furnace 2.08.06 as the extrudate discussed above, to produce a form 2.08.07 that is put into inventory 2.06.05 for subsequent sale, use or distribution.

x) Ultrahigh performance semiconductor III-V compounds and alloy production 2.03.04, as discussed above.

SETZE Water Supply from Sea Water Desalinization

In one alternative embodiment of the invention, the SETZE facility for production of potable and process water is a thermal desalinization unit. Sea water from the nearest source point will be piped to the thermal desalinization plant sited next to the HCC power plant. The bleeding-off of superheated steam from the adjacent power plant will drive the thermal desalinization process in the separation of fresh water from brine. The gas-liquid separation of sea water is achieved at 220° F. by heat transferred from the superheated steam exhaust of the HCC unit. After separation from brine, the water vapor is cooled and condensed to purified water. The recovered brine provides a valuable input to the SETZE metallurgical subsystem, in that the chlorine needed for metallurgical reduction can be extracted from the brine.

Supplemental economic benefits from desalinization beyond fresh water. After refining, the crystallized sodium chloride (NaCl—unrefined table salt) from the brine is fed to an in-country chlor-alkali plant (nonmercury cell type) for the production of chlorine, hydrogen and caustic soda. Caustic soda will be consumed in SETZE operations or sold to pulp and paper processors or water treatment utilities). The virgin chlorine product is fed into the SETZE pool of recycled chlorine as makeup and/or sold to the external chemicals' market. Another bulk use for the recovered raw NaCl, is as input to a refinery for the production of ordinary table salt.

A residual of brine processing is the bitterns mother liquor. The rich bitterns' liquor contains halide traces such as valuable iodides, bromides, magnesium chloride, and magnesium sulfate; et al, from which marketable compounds can be extracted and sold externally. Elemental magnesium can be used as a SETZE alloying agent or sold on the chemicals and/or metals markets.

Carbochlorination of Copper

The present invention also is applicable to improve the traditional copper recovery by application of a SETZE carbochlorination of copper. As will be appreciated by a person of ordinary skill in the art, the SETZE carbochlorination method is simpler and possibly less costly than the complex traditional copper recovery, in that it requires only two principal reactions whereas the traditional method of recovery has six process steps.

Traditional refining begins with the crushing/grinding of the ore, e.g., chalcopyrite ore, then concentration by froth-flotation that yields an intermediate with 15-20% Cu content. It should be understood that this percentage would be greater for bornite and chalcocite ores, which, although not discussed in this embodiment, are deemed within the scope of this disclosure. The main impurity in the concentrate is iron. However, nickel, gold, and silver are often present, along with traces of zinc, molybdenum, selenium, tellurium, cobalt, tin, and lead. Silica (sand) is added to the concentrate in a reverberatory furnace and the mixture is heated to 1400-1450° C., to make a melt. Roasting with air converts much of the iron in the concentrate to an oxide (reactions 1 and 2) that reacts with the silica to form an iron silicate slag (reaction 3). The slag separates into an upper layer that is periodically removed, leaving a lower matte layer which is largely $Cu_2S$ and FeS. The liquid matte is placed in a converter with more silica, and air is forced through it. In a similar fashion this transforms the remaining FeS first to FeO (reaction 2) and then to slag (reaction 3). The $Cu_2S$ is partially converted to $Cu_2O$ (reaction 4), which could react with any remaining FeS (reaction 5), and is finally converted to metallic or 'blister' copper (reactions 6 or 7). The blister copper, named for the appearance given by the bubbling of the $SO_2$ through the melt, is approximately 98-99% pure and can be further purified by fire refining (similar to the process above) and/or electrolysis. The electrolytic process uses the impure copper as anodes with purified copper cathodes in a solution containing $H_2SO_4$ and $CuSO_4$ as electrolytes. The electrolysis deposits quite pure (99.95%) copper on the cathodes. However, further purification can be accomplished by zone refining (to 99.9999% purity). It should be noted that byproducts of copper refining, including silver, molybdenum, selenium, tellurium, gold, and sulfuric acid, may be produced in commercially significant quantities.

The traditional process reactions for chalcopyrite concentrate are six in number given that either reaction 6 or 7 is used as the final step, but not both:

reaction 1: $2*CuFeS_2+4*O_2 \rightarrow Cu_2S+2*FeO+3*SO_{32}$
reaction 2: $2*FeS+3*O_2 \rightarrow 2*FeO+2*SO_2$
reaction 3: $2*FeO+SiO_2 \rightarrow Fe_2SiO_4$
reaction 4: $2*Cu_2S+3*O_2 \rightarrow 2*Cu_2O+2*SO_2$
reaction 5: $Cu_2O+FeS \rightarrow Cu_2S+FeO$, followed by either reaction 6 or 7:
reaction 6: $Cu_2S+O_2 \rightarrow 2*Cu+SO_2$
reaction 7: $2*Cu_2O+Cu_2S \rightarrow 6*Cu+SO_2$ In accordance with the present invention, a different process is employed. Ore crushing/grinding and froth-flotation, as discussed above, frontends the SETZE process for carbochlorination of copper; thereafter, however, SETZE has only two principal reactions rather than the required six for the prior known method. SETZE's carbochlorination/manifold fluidized bed reactor (MFBR) (z-reaction 1) converts metallic compounds to metal chlorides, then separates/purifies them for input to a line of plasma gas reduction (z-reaction 2) reactors for the production of copper powder that allows for superior alloy formation and higher performance in end-products.

z-reaction 1: $5*CuFeS_2+7.5*Cl_2+4*CO \rightarrow 5*CuCl+5*FeCl_2+4*CS_2+2*SO_2$ and
z-reaction 2/Plasma Gas Reduction: $CuCl+0.5*H_2 \rightarrow Cu+HCl$, with the following SETZE secondary byproduct reactions for iron (contrary to the traditional method of treating the iron as an impurity in slag) and carbon disulfide conversion:

z-reaction 3/Plasma Gas Reduction: $FeCl_2+H_2 \rightarrow Fe+2*HCl$
z-reaction 4: $CS_2+3*O_2 \rightarrow CO_2+2*SO_2$ Advantageously, expanding the SETZE metallurgical module to include copper supports a coal-copper paradigm in regions having coal and copper reserves. For example, the State of Montana, at 120 billion tons, reportedly has the largest recoverable coal reserves of any state in the United States and has significant copper ore reserves. The clean-coal power generation of the present invention can be successfully applied to Montana coal, and serve as a strategic step towards fulfillment of long-term US energy independence. In synergistic fashion, it also can be applied to Montana copper. In this regard, globally, the most important and voluminous copper ore is chalcopyrite ($CuFeS_2$); and this mineral has two major derivatives that occur in Montana, in economic quantities, these are: bornite ($Cu_5FeS_4$—63% copper by weight) & chalcocite ($Cu_2S$—80% copper by weight). Chalcopyrite is also present in Montana, but reportedly, not at levels in the earth that allow for economic recovery. For the copper ores of Montana, the application of carbochlorination, like the application of carbochlorination to bauxite, provides the dual benefit of clean-coal power generation and zero-emission copper—in powdered metal form for ease in mechanical blending with other elemental metallic powders for alloying.

Below, the reactions for chalcopyrite, chalcocite and bornite concentrates (pelletized) are given: (native gold and silver traces are assumed to be present for process modeling purposes).

Chalcopyrite Concentrate Reaction1: $5*CuFeS_2+7.5*Cl_2+4*CO \rightarrow 5*CuCl+5*FeCl_2+4*CS_2+2*SO_2$
Chalcocite Concentrate Reaction1: $5*Cu_2S+5*Cl_2+2*CO \rightarrow 10*CuCl+2*CS_2+SO_2$
Bornite Concentrate Reaction1: $5*Cu_5FeS_4+17.5*Cl_2+8*CO \rightarrow 25*CuCl+5*FeCl_2+8*CS_2+4*SO_2$
Gold (native) Reaction1: $Au+1.5*Cl_2 \rightarrow AuCl_3$ (s) [auric chloride, a solid]
Silver (native) Reaction1: $Ag+0.5*Cl_2 \rightarrow AgCl$ (s) [silver chloride, a solid]
Chalcopyrite, Chalcocite & Bornite Reaction2: $CS_2+3*O_2 \rightarrow CO_2+2*SO_2$
Chalcopyrite, Chalcocite & Bornite Reaction3/Plasma Gas Reduction: $CuCl+0.5*H_2 \rightarrow Cu+HCl$
Chalcopyrite and Bornite Reaction4/Plasma Gas Reduction: $FeCl_2+H_2 \rightarrow Fe+2*HCl$
Gold Reaction2/Plasma Gas Reduction: $AuCl_3+1.5*H_2 \rightarrow Au+3*HCl$ [assumes reactant auric chloride (on the left) is gaseous at higher process heat of the PGR reactor]
Silver Reaction2/Plasma Gas Reduction: $AgCl+0.5*H_2 \rightarrow Ag+HCl$ [assumes reactant silver chloride (on the left) is gaseous at higher process heat of the PGR reactor]

As one will understand, the reactions are stoichiometric, and the relationship of the copper compounds on either side involve only Cu-I—in accordance with " . . . all the known copper sulfides should be considered as purely monovalent copper compounds . . . " in the URL: http://en.wikipedia.org/wiki/Copper(II)_sulfide. Additionally, there are three oxidation levels for copper, Cu-I, Cu-II and rarely Cu-III.

The significance of Chalcopyrite, Chalcocite & Bornite Reaction 2 is to show reduction of $CS_2$ to compounds already routinely and economically managed in the overall SETZE system. $CO_2$ is processed in the carbon recovery subsystem and $SO_2$ is an input to the sulfuric acid production line, as described above. Thus, combining coal and copper carbochlorination provides greater efficiencies for the carbon recovery and software acid subsystems.

One skilled in the art will appreciate that the invention can be performed by other than the embodiments disclosed, which are provided for purposes of illustration, and not of limitation.

I claim:

1. An integrated process for the provision of fuel for zero-emission power generation, metallurgical reduction, and carbon oxides management to mitigate greenhouse gases, comprising:

providing a source of each of steam, oxygen gas, and chlorine gas, gasifying a carbonaceous source using said steam and oxygen, and producing a gaseous hydrogen output and a gaseous carbon monoxide output;

performing carbochlorination on an ore containing a plurality of metallic components using said chlorine gas as a reactant and said gaseous carbon monoxide as an oxygen sink, producing from said carbochlorination a heterogeneous output stream containing a plurality of metal chlorides corresponding to carbochlorination of said plurality of metallic components, and a gaseous carbon dioxide output;

processing said heterogeneous output stream in a manifold fluidized bed reactor (MFBR) and segregating said plurality of metal chlorides into a plurality of homogeneous metal chloride output streams and a byproduct carbon dioxide stream, each homogeneous metal chloride stream corresponding to one of said plurality of metallic components, passing said plurality of homogeneous output streams into a corresponding plurality of containers, each container containing a segregated metal chloride; and managing said gaseous carbon monoxide and carbon dioxide generated by said gasifying and carbochlorination steps, comprising:

passing said carbon monoxide output from said gasifying step to said carbochlorination step as said oxygen sink;

converting said gaseous carbon dioxide output from said carbochlorination step into a methane pool augmentation output, an elemental carbon output, and a chemical synthesis output;

consuming said elemental carbon output in a manufacturing process; and consuming at least a first portion of said gaseous hydrogen output in a power generator step, and consuming a second portion of said gaseous hydrogen output in a chemical synthesis process;

wherein said integrated system is essentially free of greenhouse gas emissions; wherein the emissions of said power generator step are essentially free of greenhouse gasses.

2. The method of claim 1, wherein consuming said first portion of said hydrogen output and said oxygen gas further comprises consuming said first portion of said hydrogen output and said oxygen gas in a combined cycle power generation system and producing zero-emission power and byproduct steam.

3. The method of claim 1 further comprising providing a source of nitrogen gas, wherein consuming said second portion of hydrogen gas in a chemical synthesis process further comprises synthesizing ammonia from said second portion of said gaseous hydrogen output and said nitrogen gas.

4. The method of claim 1 wherein consuming said gaseous carbon dioxide into a chemical synthesis output further comprises manufacturing from said carbon dioxide one or more of a methane and a urea.

5. The method of claim 1 wherein consuming said elemental carbon in a manufacturing process further comprises providing a precursor rayon, thermally impregnating said precursor rayon with said elemental carbon to achieve a nominal carbon content approximating 85% carbon by weight, processing said impregnated rayon by an oxidation/pyrolysis to obtain carbon filament, and converting said carbon filament to a carbon fiber.

6. The method of claim 5 further comprising consuming said carbon fiber by manufacturing a product selected from among the group consisting of carbon fiber reinforced precast concrete modules containing Portland Cement, carbon fiber reinforced precast concrete modules containing flyash cement, and carbon fiber reinforced plastic.

7. The method of claim 1 wherein converting said carbon dioxide output into said chemical synthesis output further comprises manufacturing a product selected from among the group consisting of a petrochemical feedstock, a fertilizer, a resin, and a plastic.

8. The method of claim 1 wherein consuming said elemental carbon in a manufacturing process further comprises manufacturing a carbide product.

9. The method of claim 8 wherein manufacturing the carbide product further comprises manufacturing a carbide selected from among the group consisting of a tungsten carbide, a silicon carbide, an alumna silicon carbide, and a tungsten carbide nickel.

10. The method of claim 1 further comprising providing a biomass as said carbonaceous source.

11. The method of claim 1 further comprising providing a bituminous coal or lignite as said carbonaceous source.

12. The method of claim 1 wherein providing said ore further comprises providing an ore containing an aluminum component that is unsuitable for use in a traditional BHH monoprocessing process for producing aluminum.

13. The method of claim 12 wherein providing said ore further comprises providing a bauxite.

14. The method of claim 12 wherein providing said ore further comprises providing a bauxite containing $Al_2O_3$, $Fe_2O_3$, $TiO_2$, $SiO_2$, and at least one trace metal oxides and water, said bauxite being is suitable as an input to said BHH process, and a laterite containing $Al_2O_3$, $Fe_2O_3$, $TiO_2$, $SiO_2$, and at least one trace metal oxide and water, said laterite being not suitable as an input to said BHH process.

15. The method of claim 14 further comprising providing said bauxite with a nominal weight composition of 55% $Al_2O_3$, 3.5% $Fe_2O_3$, 2.8 $TiO_2$, 6% $SiO_2$, and providing said laterite with a nominal weight composition of 38% $Al_2O_3$, 33% $Fe_2O_3$, 2.8% $TiO_2$, 2.7% $SiO_2$.

16. The method of claim 1 further comprising purifying said hydrogen gas output and reducing at least one of said plurality of metal chlorides with said purified hydrogen by a plasma gas reduction process and producing at least one virgin nanoscale metallic powder and a byproduct hydrogen chloride gas suitable for recycling to an elemental chlorine.

17. The method of claim 16 wherein reducing said at least one metal chloride further comprises processing said at least one virgin nanoscale metallic powder and producing an intermetallic selected from among the group consisting of a silver tungsten, a nickel titanium, a titanium aluminum, a titanium silicon, and an iron aluminide.

18. The method of claim 16 wherein reducing said at least one ore metal chloride further comprises producing at least one of an aluminum, a copper, an iron, a silicon, a titanium, a gallium, a zirconium, a vanadium, a scandium, a chromium, and an indium nanoscale metallic powder.

19. The method of claim 1 further comprising purifying said hydrogen gas output and reducing said plurality of metal chlorides with said purified hydrogen by a plasma gas reduction process and producing a plurality of homogeneous virgin nanoscale metallic powders and a byproduct hydrogen chloride gas suitable for recycling to an elemental chlorine.

20. The method of claim 1 further comprising purifying said gaseous hydrogen output and reducing at least one of said plurality of metal chlorides with said purified hydrogen by a plasma gas reduction and forming dendritically-shaped metallic particles and a byproduct hydrogen chloride gas suitable for recycling to an elemental chlorine.

21. The method of claim 20 wherein reducing the at least one metal chloride further comprises producing at least one of an aluminum, a copper, an iron, a silicon, a titanium, a gallium, a zirconium, a vanadium, a scandium, a chromium, and an indium dendritically-shaped metallic powder.

22. The method of claim 1 further comprising purifying said gaseous hydrogen output and reducing said plurality of metal chlorides with said purified hydrogen by a plasma gas reduction and forming a plurality of dendritically-shaped metallic particles and a byproduct hydrogen chloride gas suitable for recycling to an elemental chlorine.

23. The method of claim 1 further comprising reforming at least one of said plurality of metal chlorides by a plasma oxide synthesis and producing therefrom at least one of a titanium dioxide, a chromium oxide and a zirconium oxide having a plasma-formed crystalline structure.

24. The method of claim 1 wherein said gasifying step further comprises using a rotary kiln gasifier and using a gas-gas cyclonic separation process to provide said gaseous hydrogen output and said gaseous carbon monoxide output.

25. The method of claim 1 wherein said gasifying step further comprises producing byproducts of said gasification and separating said byproducts into bulk quantities.

26. The method of claim 25 wherein producing said byproducts further comprises producing a sulfur byproduct and converting said sulfur byproduct into a sulfuric acid.

27. The method of claim 25 further comprising hydrogenation of said carbon monoxide over a catalyst and synthesizing therefrom a plurality of hydrocarbons.

28. The method of claim 27 further comprising regulating said hydrogen gas and carbon monoxide gas inputs to said hydrogenation process and maintaining a critical ratio for synthesizing said plurality of hydrocarbons, and redirecting a surplus carbon monoxide to said carbochlorination process.

29. The method of claim 27 wherein producing said plurality of hydrocarbons further comprises producing a heterogeneous mixture of $C_2$ to $C_{20}$ intermediates.

* * * * *